US011899786B2

(12) United States Patent
Nguyen et al.

(10) Patent No.: US 11,899,786 B2
(45) Date of Patent: Feb. 13, 2024

(54) DETECTING SECURITY-VIOLATION-ASSOCIATED EVENT DATA

(71) Applicant: CrowdStrike, Inc., Sunnyvale, CA (US)

(72) Inventors: Cory-Khoi Quang Nguyen, Lafayette, IN (US); Jaron Michael Bradley, Mason, MI (US); William Leon Charles Pauley, Ann Arbor, MI (US)

(73) Assignee: CrowdStrike, Inc., Sunnyvale, CA (US)

( * ) Notice: Subject to any disclaimer, the term of this patent is extended or adjusted under 35 U.S.C. 154(b) by 805 days.

(21) Appl. No.: 16/507,194

(22) Filed: Jul. 10, 2019

(65) Prior Publication Data

US 2020/0327225 A1 Oct. 15, 2020

Related U.S. Application Data

(60) Provisional application No. 62/834,056, filed on Apr. 15, 2019.

(51) Int. Cl.
*G06N 3/08* (2023.01)
*G06N 3/044* (2023.01)
(Continued)

(52) U.S. Cl.
CPC ............ *G06F 21/554* (2013.01); *G06N 3/044* (2023.01); *G06N 3/08* (2013.01); *G06V 30/1985* (2022.01); *G06F 2221/034* (2013.01)

(58) Field of Classification Search
CPC ............ G06F 21/554; G06F 2221/034; G06N 3/0445; G06N 3/08; G06N 3/044; G06V 30/1985
See application file for complete search history.

(56) References Cited

U.S. PATENT DOCUMENTS

2012/0088584 A1* 4/2012 Mamtani .......... H04N 21/26613
463/42
2017/0244737 A1* 8/2017 Kuperman .......... H04L 63/1425
(Continued)

FOREIGN PATENT DOCUMENTS

CN 108809727 A * 11/2018 ......... H04L 41/0631
JP 2018520419 A 7/2018

OTHER PUBLICATIONS

Machine translation of Xie et al. China publication CN108809727A (Year: 2018).*

(Continued)

*Primary Examiner* — Jung W Kim
*Assistant Examiner* — Howard H. Louie
(74) *Attorney, Agent, or Firm* — Lee & Hayes, P.C.

(57) ABSTRACT

An event can be analyzed for association with a security violation. Characters or other values of event data (e.g., command-line text) associated with the event can be provided sequentially to a trained representation mapping to determine respective representation vectors. Respective indicators can be determined by applying the vectors to a trained classifer. A token in the event data can be located based on the indicators. The event's can be determined to be associated with a security violation based on the token satisfying a token-security criterion. The representation mapping can be trained by adjusting model parameters so the trained representation predicts, based on a character of training command-line text, an immediately following character in the training command-line text. The classifier can be determined based on the trained representation mapping and classification training data indicating whether respective portions of training event data are associated with security violations.

19 Claims, 12 Drawing Sheets

(51) Int. Cl.
    *G06F 21/55*    (2013.01)
    *G06V 30/196*   (2022.01)

(56) References Cited

U.S. PATENT DOCUMENTS

| | | | | |
|---|---|---|---|---|
| 2018/0204120 | A1* | 7/2018 | Rei | G06N 3/04 |
| 2018/0300623 | A1* | 10/2018 | Zhang | G06N 3/08 |
| 2018/0309636 | A1* | 10/2018 | Strom | H04L 45/02 |
| 2019/0166141 | A1* | 5/2019 | Xu | G06N 3/0454 |
| 2019/0260204 | A1* | 8/2019 | Koval | G06N 3/126 |
| 2020/0090027 | A1* | 3/2020 | Oliner | G06N 3/0445 |

OTHER PUBLICATIONS

The Partial European Search Report dated Aug. 27, 2020 for European Patent Application No. 20168851.2, a counterpart of U.S. Appl. No. 16/507,194, 16 pages.

Hendler et al, "Detecting Malicious PowerShell Commands using Deep Neural Networks", ARXIV.org, Cornell University Library, Ithaca, NY, Apr. 11, 2018, 19 pages.

The Extended European Search Report dated Nov. 30, 2020 for European Patent Application No. 20168851.2, 13 pages.

Fortuner, B., et al., "Logistic Regression", retrieved Apr. 5, 2019 from <<https://ml-cheatsheet.readthedocs.io/en/latest/logistic_regression.html>> at commit 34b6eeb2c23fad18ce2ded56dbcb3ff9160f05eb, 13 pages. Originally published Apr. 22, 2017; latest update Feb. 14, 2019.

Karpathy, A., "Minimal Character-level Language Model with a Vanilla Recurrent Neural Network in Python/numpy", Jul. 26, 2015, retrieved Apr. 11, 2019 from <<https://gist.github.com/karpathy/d4dee566867f8291f086>>, 29 pages.

Olah, C. "Understanding LSTM Netowrks", Aug. 27, 2015, retrieved Apr. 5, 2019 from <<https://colah.github.io/posts/2015-08-Understanding-LSTMs/>>, 9 pages.

\* cited by examiner

DETECTING SECURITY-VIOLATION-ASSOCIATED EVENT DATA

CROSS-REFERENCE TO RELATED APPLICATION

This application is a nonprovisional application of, and claims priority to and the benefit of, U.S. Patent Application Ser. No. 62/834,056, filed Apr. 15, 2019, entitled "Detecting Security Violations in Command-Line Portions," the entirety of which is incorporated herein by reference.

BACKGROUND

With computer and Internet use forming an ever-greater part of day-to-day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, macros or scripts embedded in document files, steganographic encodings within media files such as images, or other types of computer programs, or combinations thereof.

Another type of cyber attack is a "targeted" attack, e.g., by an adversary operating as an advanced persistent threat (APT). Targeted attacks often attempt to gain command-line access to target systems. Targeted attacks may use malware, or may use other techniques that do not require running malware on target systems. Examples include phishing and exploits that compromise benign software. For example, a benign program with administrative privileges may be compromised using a remote zero-day attack to provide an adversary with unauthorized administrative access to a system, even without the use of malware. Additionally or alternatively, an adversary may steal the credentials of a legitimate user, access the system as that user, and then elevate privilege level (e.g., using those credentials, or by exploiting a vulnerability). This may permit the adversary to use normal administrative tools, but without authorization. Given the wide variety of attack types, it is challenging to determine if activity taking place on a computer is malicious.

As used herein, the terms "adversary" or "adversaries" include not only malware developers but also exploit developers, builders and operators of an attack infrastructure, those conducting target reconnaissance, those executing targeted operations, those performing data exfiltration, those maintaining persistence in the network, etc. Thus the "adversaries" can include numerous people or other entities that are all part of an "adversary" group.

To counter these threats, governments, enterprises, and individuals use a range of security applications and services. Typically, these applications and services scan a device for a signature of a security exploit such as a piece of malware. Responsive to finding the signature, the applications and services quarantine or delete the exploit. The applications and services often miss more sophisticated security violations, however, such as non-malware malicious activity (e.g., an adversary's login session).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
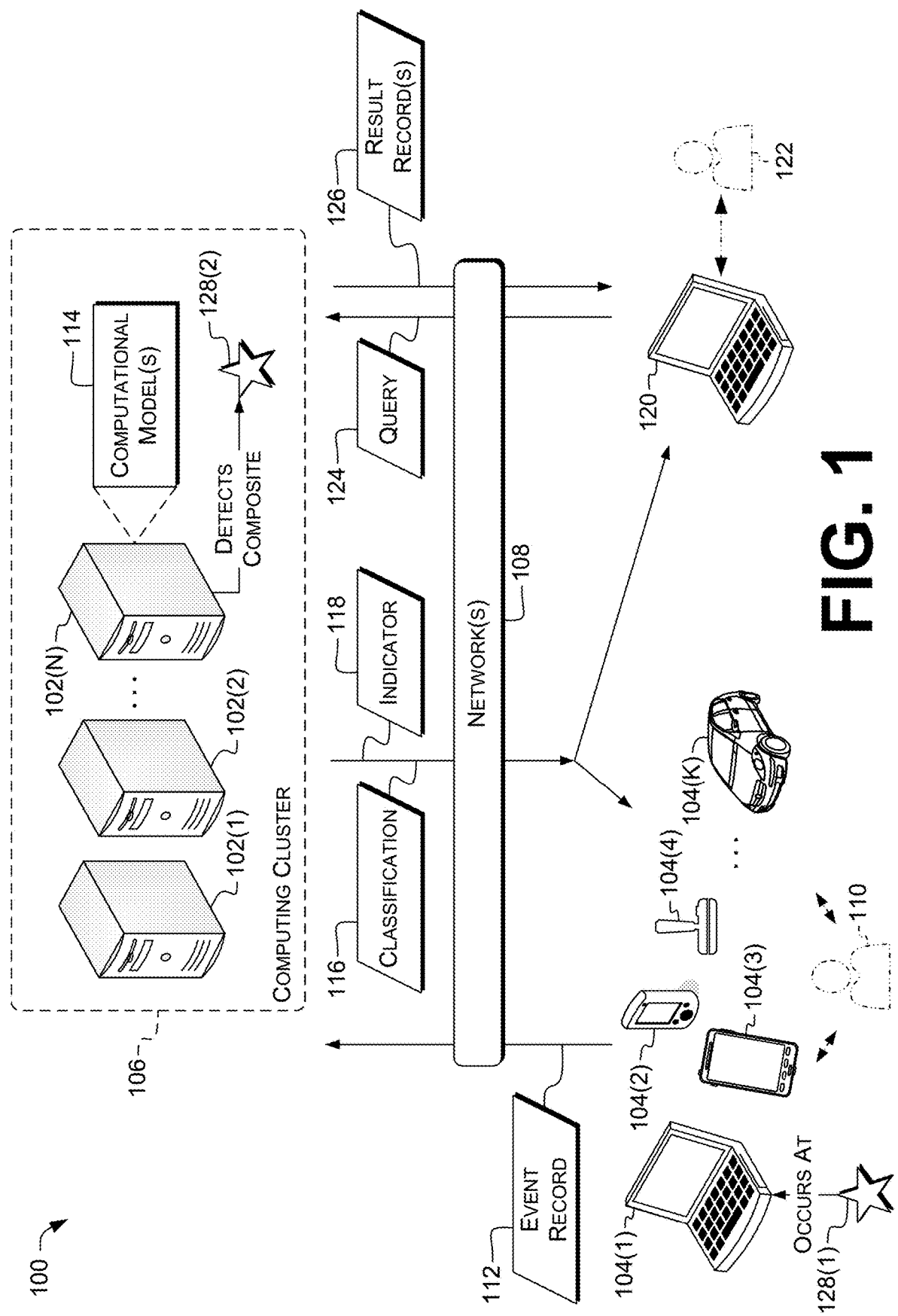
FIG. 1 is a block diagram depicting example scenarios for performing security analysis of events as described herein.

Some examples herein relate to classification of events occurring at a monitored computing device to determine whether those events are associated with a security violation, e.g., malicious. Some examples relate to analysis of event data associated with an event, e.g., command-line text. Some examples permit determining portions of the event data that are, or are likely, associated with a security violation.

For brevity, events or other security-relevant data are described herein as "associated with a security violation" (or "computer-security violation") if those events or other data are at least one of: associated with malware; associated with or performed by an APT adversary; performed or generated while conducting, preparing to conduct, or attempting to conduct malicious activities; or otherwise performed or generated while attempting to gain or use, or gaining or using, unauthorized access to a computing system or network. Paras. [0051]-[0055] give various examples of events associated with security violations.

Throughout this document, "dirty" is used for brevity to refer to events associated with security violations, such as malware or other malicious components or behavior (e.g., any of the examples listed in the Background); feature vectors representing such events; or other values associated with, produced by, or indicative of malware, malicious behavior, or other security violations (e.g., activity by an APT adversary). "Clean" is used to refer to events or values that are not dirty. A "false detection" or "false positive" is a determination that an event is associated with a security violation when, in fact, that event is not associated with a security violation, or the event that is the subject of such a determination. A "false miss" or "false negative" is a determination that an event is not associated with a security violation when, in fact, that event is indeed associated with a security violation, or the event that is the subject of such a determination. Throughout this document, unless otherwise specified, references to an event can refer to a sequence of events that are represented by a single higher-level event. That is, an event can represent any number or arrangement of subsidiary events. In some examples, an event is an example of the Component in the Composite design pattern.

Throughout this document, a "data stream" can include data stored in, e.g., a file, a disk boot sector or partition root sector, or a block of memory, or a portion thereof. For brevity, the term "sample" herein refers to a data stream, or a portion of a data stream, being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample. Some examples determine or use a classification indicating, e.g., characteristics of a sample (e.g., a data stream) or an event related thereto.

In some examples, each of one or more monitored computing devices is equipped with a security agent (e.g., a service or daemon process) to monitor events on that device. Those monitored computing devices may be in communication with devices of a security service system, e.g., implemented using cloud technology. The security service system can filter and analyze events, and present to security analysts only events associated with security violations. This can, e.g., reduce the volume of events from thousands per second to a few per minute, permitting analysts to triage and research the suspicious events. Some examples perform this filtering based on behavior, permitting the detection of previously unknown threats.

While example techniques described herein may refer to analyzing events that may potentially be malicious, it is understood that the techniques may also apply to other types of events, e.g., produced by non-malicious software, processes, or other system components. For example, techniques described herein can be used in determining which processes are accessing particular files or other system resources, or in analyzing causes of excess resource usage by processes. Accordingly, analysis of events as discussed herein may be used by, for example, anti-malware security researchers, white-hat vulnerability researchers, interoperability developers, anti-piracy testers, or other analysts of data streams. In some examples, the described techniques are used to detect, and prevent execution of, malicious actions at a computer. In some examples, techniques described herein can be used to detect malicious activity without requiring detection of a specific software package or version. This can provide increased robustness against polymorphic malware and against zero-day exploits used by APT adversaries. Some examples are described with reference to malware, but techniques described herein are not limited to files or events associated with malware.

Various entities, configurations of electronic devices, and techniques for performing security analyses, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs). As used herein, a "random" value can be a truly random value, e.g., measured from physical phenomena, or a pseudorandom value. Examples of random values include cryptographically-strong random numbers.

In some examples, the techniques discussed herein can be implemented on or for a monitored computing device and can include detecting an event, e.g., an action of interest (AoI), committed or triggered by an object (i.e., a function, module, process, or thread) executed by the monitored computing device. Some techniques discussed herein can detect that an event is related to a security violation based at least in part on analyzing command lines associated with that event. In some examples, the techniques can take preventative action (e.g., blocking an object associated with the event) without input from a user. This can greatly increase the ease of implementing security for a computing device and may prevent greater damage from occurring due to a violation by stopping the violation before it has progressed beyond preliminary actions or events.

For brevity and clarity herein, several Perl notations are used. "$name= . . . " defines an entity called "name" with the value " . . . ". "qr { . . . }" represents the Perl (or Perl-compatible, PCRE) regular expression " . . . ". "q{ . . . }" represents the literal text " . . . ", except that "\{" is replaced with "{" in " . . . ", and likewise "\}" with "}" and "\ \" with "\". "qw{ . . . }" represents the list of whitespace-delimited items in the string " . . . ". For example, qw { ' hello 42' 1337} is the list with the three items "'HELLO", "42'", AND "1337".

Various examples herein are given with respect to 64 characters in a block, a 128-character set, 4096 LSTM nodes per layer, and a two-output logistic classifier. However, other values can be used for any of these numbers. Some examples are discussed herein. In some examples, the logistic classifier has more than two outputs, e.g., clean/malware/targeted (instead of clean/dirty).

In some examples, a module or subsystem "feeds" a second (or equivalently, the second is "fed by" the first). As used herein, "fed by" and "feeds" describe data flow(s) from the first module or subsystem to the second via zero or more intervening module(s) or subsystem(s), in any combination. For example, an output of a first module can be provided directly as an input of a second module. Additionally or alternatively, the first module can provide data to at least one intervening module or subsystem, which can in turn provide the data (or a transformed version thereof) to the second module or subsystem. The first module or subsystem is referred to as "upstream" and the second module or subsystem is referred to as "downstream." In some examples, first and second modules may exchange data or other signals bidirectionally, in which case each is "upstream" of the other for the transmissions it originates, and "downstream" of the other for the transmissions it receives.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein. Section headers in this Detailed Description are solely for convenience in reading.

Some examples include features from only one section. Some examples include features from more than one section. Use of the terms "first," "second," and similar in the Detailed Description does not imply or require chronological order unless expressly stated.

Illustrative Environment

FIG. 1 shows an example scenario 100 in which examples of security-analysis system can operate or in which security analysis techniques such as those described herein can be performed. Illustrated devices or components of scenario 100 include computing device(s) 102(1)-102(N) (individually or collectively referred to herein with reference 102), for integer N≥1, and computing devices 104(1)-104(K) (individually or collectively referred to herein with reference 104), for integer K≥1. In some examples, N=K; in other examples, N<K or N>K. Although illustrated as, e.g., desktop computers, laptop computers, tablet computers, or cellular phones, computing device(s) 102 or 104 can include a diverse variety of device categories, classes, or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (e.g., computing device(s) 102) that work together to accomplish a computing task assigned to the cluster as a whole. In some examples, computing device(s) 104 can be clients of cluster 106 and can submit jobs to cluster 106 or receive job results from cluster 106.

In some examples, computing devices 102 or 104 can intercommunicate or communicate with external device(s), e.g., via one or more network(s) 108, to participate in or carry out computational-model determination or operation as described herein. For example, computing device 104(1) can be or include a monitored computing device or other data source owned or operated by or on behalf of a user, and computing device 102(1) can be a computational-model determination and operation system, as described herein. Network(s) 108 can include public networks such as the Internet, private networks such as an institutional or personal intranet, or combination(s) of private and public networks. Communications between computing devices 102 or 104 via network(s) 108 can be structured, e.g., according to defined application programming interfaces (APIs). For example, data can be retrieved via network(s) 108, e.g., using a Hypertext Transfer Protocol (HTTP) request such as a GET to a Web Services or Representational State Transfer (REST) API endpoint. Remote Procedure Call (RPC) APIs or other types of APIs can additionally or alternatively be used for network communications.

In some examples, computing devices 102 or 104 interact with or are operated by an entity 110 (shown in phantom). The entity 110 can include systems, devices, parties such as users, or other features with which computing devices 102 or 104 can interact. For brevity, examples of entity 110 are discussed herein with reference to users of a computing device 104; however, these examples are not limiting.

In the illustrated example, computing devices 104 transmit event records 112 to computing devices 102. Event records 112 can include event data associated with events. Computing devices 102 filter and otherwise handle the event records 112 to determine whether events associated with the event records 112 are associated with security violations or are otherwise suspicious. For example, computing devices 102 can determine or operate computational model(s) (CM(s)) 114, or other algorithms such as tokenization algorithms, to determine an output corresponding to event(s) on a user's computing device 104. For example, the output can include a classification 116 indicating whether or not the event(s) are associated with a security violation. Additionally or alternatively, the output can include an indicator 118 designating portions of event record 112 that are associated with a security violation. Indicator 118 can include data, e.g., indicating which characters or tokens (or other spans of characters) in command-line data of event record 112 are considered dirty.

In response to an output indicating a security violation, computing devices 102 can apply a "tag" to each event record 112 associated with the security violation, e.g., by storing data of the classification 116 or other tag in the event record 112. Tags can be represented as, e.g., strings (e.g., "dirty.malware"), enumerated values (e.g., 1 for malware, 2 for targeted activity, 3 for other dirty, or 4 for clean), or XML tags or other structured text. The computing device(s) 102 can provide to computing device(s) 104 the classification 116 or other outputs of processing using computational models described herein.

As used herein, "structured text" describes data-serialization formats that: express data in a human-readable character set (e.g., ASCII, ISO 8859-1, or any encoding of Unicode); permit including at least two logically separate data values in a single serialized data object; and permit including metadata within the serialized data object distinguishing the at least two logically separate data values from each other. Examples of structured text include, but are not limited to, JavaScript Object Notation (JSON), Extensible Markup Language (XML), Abstract Syntax Notation 1 (ASN.1) encoded with the Generic String Encoding Rules (GSER), ASN.1 encoded with the JSON Encoding Rules (JER), ASN.1 encoded with the XML Encoding Rules (XER) (or variants such as Canonical XER or Extended XER), YAML ("YAML Ain't Markup Language"), Initialization (INI) files (or variants or extensions such as TOML, "Tom's Obvious, Minimal Language"), or comma-separated value (CSV) (or variants using other separators, such as tab-separated, TSV). XER-encoded ASN.1 is also XML, and JER-encoded ASN.1 is also JSON.

Computing device(s) 102 can store one or more CM(s) 114, individually or collectively referred to herein with reference 114. In some examples, algorithms for determining CM(s) 114 as described herein can be performed on computing device(s) 102.

In some examples, classification 116 is provided to computing device(s) 104. This can permit computing device(s) 104 to, e.g., take mitigation actions or advise entit(ies) 110 of an event associated with a security violation. Additionally or alternatively, classification 116 can be provided to computing device(s) 120 (for brevity, only one is shown), e.g., operated by entity 122 (shown in phantom). Entity 122 can be a security analyst working for a security service, in some examples. Additionally or alternatively, entity 122 can include systems, devices, parties such as users, or other features with which computing devices 120 can interact. For brevity, examples of entity 122 are discussed herein with reference to security analysts using a computing system; however, these examples are not limiting.

In some examples, computing device 120 (e.g., operated by an entity 122 such as a security analyst) can transmit a query 124 (e.g., a search query) to cluster 106. Cluster 106 can respond to computing device 120 with result record(s) 126 corresponding to event record(s) 112 satisfying the query 124. For example, query 124 can include at least one tag criterion, and result record(s) 126 can include event record(s) 112 that have been tagged with tag(s) matching the at least one tag criterion. Computing device 120 can then present at least some of the result record(s) 126 to entity 122 via a user interface. In some examples, a query 124 includes a threshold significance level and an analysis mode, and a result record 126 includes an indicator 118 designating portions of event record 112 that match that query 124. The analysis mode can be, e.g., a token-analysis mode (e.g., requesting use of operation 528) or a character-analysis mode (e.g., requesting use of operation 724). In some examples, a result record 126 can include a visual representation of an event record 112 and a corresponding indicator 118, e.g., a representation in which contents of the event record 112 are presented, those designated by indicator 118 in one style (e.g., inverse video or highlighted) and those not designated by indicator 118 in a different, perceptibly distinguishable style (e.g., normal video).

Throughout this document, any determination that a particular data item "satisfies" a query or criterion is equivalent to a determination that that data item fails to satisfy an inverse query or criterion. For example, in a system in which each record is tagged with exactly one of the three tags "Dirty," "Clean," and "Unknown," a query 124 for all records tagged "Dirty" is equivalent to a query 124 for all records that are not tagged "Clean" and that are also not tagged "Unknown." Accordingly, discussion of queries and criteria throughout specifically contemplates the use of inverted queries or criteria with inverted senses of what satisfies a query or criterion.

As noted above, an event can represent a single occurrence at a monitored computing device 104, or can represent one or more (e.g., multiple) other events or sub-events. In some examples, a classification 116, indicator 118, or result record 126 can be associated with a specific event record 112, or with a composite event or other event not directly represented by a specific event record 112 from a monitored computing device 104. Any of these types of events are referred to herein individually or collectively with reference 128, and are graphically depicted as stars. In the illustrated example, an event 128(1) occurs at monitored computing device 104(1), and is represented by an event record 112. Event 128(2) is a composite event detected by computing device 102(N), e.g., by combining or correlating data from multiple events 128 occurring at monitored computing device(s) 104.

Different devices or types of computing devices 104, 120 can have different needs or ways of interacting with cluster 106. For example, cluster 106 can interact with discrete request/response communications to computing devices 104 to determine additional data. Additionally or alternatively, computing devices 104 can be data sources (e.g., running security agents) and can interact with cluster 106 with discrete or ongoing transmissions of event records to be handled. For example, a data source in a monitored computing device 104(1) can provide to cluster 106 data of events such as file installations, process launches, or writes to system files. Additionally or alternatively, computing devices 104 can be data sinks and can interact with cluster 106 with discrete or ongoing requests for data output from CMs 114, e.g., updates to blacklists or other security-relevant information.

In various examples, e.g., of CM(s) 114 for classifying events or other use cases noted herein, the CM(s) 114 may include, but are not limited to, multilayer perceptrons (MLPs), neural networks (NNs), gradient-boosted NNs, convolutional NNs (CNNs), deep neural networks (DNNs) (i.e., neural networks having at least one hidden layer between an input layer and an output layer), autoencoders (e.g., DNNs in which the dimensionality of the hidden-layer outputs is smaller than that of the input layer or the output layer), recurrent neural networks (RNNs) such as long short-term memory (LSTM) networks or Gated Recurrent Unit (GRU) networks, decision trees such as Classification and Regression Trees (CART), boosted trees or tree ensembles such as those used by the "xgboost" library, decision forests, autoencoders (e.g., denoising autoencoders such as stacked denoising autoencoders), Bayesian networks, support vector machines (SVMs), or hidden Markov models (HMNIs). In some examples of DNNs, the hidden layer has fewer neurons than the input layer does, and the hidden layer has fewer neurons than the output layer does. In these examples, the hidden layer is an example of a chokepoint layer. In some examples, the DNN includes more than one hidden layer. The CMs 114 can additionally or alternatively include regression models, e.g., linear or non-linear regression using mean squared deviation (MSD) or median absolute deviation (MAD) to determine fitting error during the regression; linear least squares or ordinary least squares (OLS); fitting using generalized linear models (GLM); hierarchical regression; B a y e si an regression; or nonparametric regression. In some examples, CMs 114 include networks having LSTM cells such as those shown in inset 330. In some examples, CMs 114 include network arrangements such as those shown in FIG. 3.

The CMs 114 can include parameters governing or affecting the output of the CM 114 for a particular input. Parameters can include, but are not limited to, e.g., per-neuron, per-input weight or bias values, activation-function selections, neuron weights, edge weights, tree-node weights, or other data values. A training module 228, FIG. 2, can be configured to determine CMs 114, e.g., to determine values of parameters in CMs 114. For example, CMs 114 can be determined using an iterative update rule such as gradient descent (e.g., stochastic gradient descent or AdaGrad) with backpropagation.

In some examples, the training module 228 can determine the CMs 114 based at least in part on "hyperparameters," values governing the training. Example hyperparameters can include learning rate(s), momentum factor(s), minibatch size, maximum tree depth, maximum number of trees, regularization parameters, dropout, class weighting, or convergence criteria. In some examples, the training module 228 can determine the CMs 114 in an iterative technique or routine involving updating and validation. The training data set can be used to update the CMs 114, and the validation data set can be used in determining (1) whether the updated CMs 114 meet training criteria or (2) how the next update to the CMs 114 should be performed.

The computing device(s) 102 can be configured to use the determined parameter values of trained CM(s) 114 to, e.g., categorize or classify an event or event sequence with respect to association with malware, a targeted attack, or another security violation, or to perform other data analysis or processing. In some examples, the computing device 104 can be configured to communicate with computing device(s) 102 to operate a CM 114. For example, the computing device 104 can transmit a request to computing device(s) 102 for an output of the CM(s) 114, receive a response (e.g., a classification 116), and take action based on that response. For example, the computing device 104 can provide to entity 110 information included in the response, or can quarantine or delete file(s) indicated in the response as being associated with a security violation. In some examples, computing device 104 can transmit event record(s) 112 to cluster 106, and cluster 106 can push notifications of classification(s) 116 to computing device 104 in response to a determination that an event is associated with a security violation.

In some examples, a classification 116 includes a rational or real number (e.g., in floating- or fixed-point representation), a bitmask, an attribute list, a softmax output, or another representation of categories to which the event represented by or associated with an event record 112 belongs, as determined by CM(s) 114. For example, classification(s) 116 or result record(s) 126 can include Boolean value(s) indicating whether or not corresponding event(s) are associated with security violation(s). Additionally or alternatively, classification(s) 116 or result record(s) 126 can include enumerated value(s) indicating with which (if any) of several categories the analyzed event(s) are associated (e.g., "benign," "virus," or "spyware"). In some examples, a benign event is indicated by a classification 116 that does not indicate that the event is associated with a category indicative of a security violation (e.g., "benign" is the absence of another category, rather than the presence of a "benign" category). Classification 116 can additionally or alternatively include one or more confidence values or other values indicating the likelihood of a classification, e.g., a "spyware" value of 0.42 indicating a 42% likelihood that the event is, e.g., an attempt to install spyware. In an example, classification 116 can include multiple confidence values for respective categories of malware (e.g., "spyware=0.42; worm=0.05").

In some examples, an indicator 118 includes indices of one or more characters, or start+length or start+end indices of one or more tokens or character sequences, that are or may be associated with a security violation. Indices can be zero- or one-based, and can designate character or between-character positions. For example, the characters "evil" in the data "c: \evil.exe" can be represented in zero-based character positions as [3,6] or [3,7], in position+length as (3,4), or in zero-based between-character positions as (3,7). If that string is tokenized as qw{c:\evil.exe}, the characters can be represented by the zero-based token index 2 or the one-based token index 3.

An event (or sequence of events, or composite event, and likewise throughout this document) can be associated with a security violation (e.g., an intrusion or other malicious behavior) if, e.g., the event was produced by malicious code (e.g., malware) or at least a portion of a grouping of malicious code (e.g., a benign file modified by a file infector virus); the event was triggered by a generator commonly used for generating malware (e.g., a packer or installer); or the event relates to creation or use of an input file relied on by malware (e.g., a large sequence of data designed to trigger a buffer overflow that will permit remote code execution, or shellcode embedded in a document file). Examples of security violations or activity associated therewith can include: the specific exploitation of a vulnerability (e.g., to gain the ability to execute code on a computing device 104 or to elevate privileges on the computing device 104); the use by an adversary of stolen credentials to run commands via an administrative protocol such as Windows Management Instrumentation, WMI, or other exploitation of user credentials and remote-access or system-management protocols or tools to gain unauthorized access to a computing device 104.

In an example of generators, a data stream may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with a security violation, and events related to the decruncher may be indicated as such by the classification 116. Malicious code, generators, shellcode, and other data streams described in this paragraph are referred to for brevity as "associated with a security violation."

In some examples, malware comprises malicious data instead of or in addition to malicious code. Such data is also considered to be associated with a security violation, and events triggered by or otherwise related to such data can be considered to be associated with security violations. For example, some programs may have bugs that prevent them from correctly processing certain inputs. Examples include Structured Query Language (SQL) injection attacks, in which a program populates a query with unescaped external data. For example, the query template "SELECT cost from Products WHERE name LIKE '% {$name} %';" can be abused by providing malicious data to be populated in place of the placeholder "{$name}". When the malicious data $name='foo'; DROP TABLE Products; —" is substituted into the query template, for example, the resulting query will cause the "Products" table of the database to be deleted ("dropped"), causing unexpected loss of data.

In another example, malicious data can include malformed UTF-8 (Unicode Transformation Format—8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with a security violation.

For generators and other examples or use cases described herein, a determination that an event is associated with a security violation does not necessarily require or guarantee that the event indeed be triggered by malware or a targeted attack, or that any data stream related to the event in fact be associated with a security violation. For example, systems and techniques herein may make such a determination based at least in part on a predetermined threshold or other parameter, e.g., provided by a security analyst or other entity 122. In some examples, some generators and input streams are used for malware, and are also used for legitimate software. In some examples, classification 116 can be used by a security analyst (e.g., entity 122) in triaging events, and can permit the security analyst to readily separate events based on a likelihood they are in fact associated with security violations such as malware or targeted attacks. In some examples, a computer-security system can delete or quarantine files associated with security violations, or terminate processes launched from data streams associated with a security violation or represented in events associated with security violations.

Except as expressly indicated otherwise, a determination of whether a data stream or event is associated with malware or another security violation is carried out programmatically by or using CM(s) 114 or other algorithms, e.g., according to techniques herein. Various examples herein can be performed without human judgment of whether an event or data stream is in fact malicious. Using CM(s) 114, tokenization algorithms, or other techniques herein can permit identifying potential computational threats, e.g., in the context of an antivirus program, cloud security service, or on-premises security appliance, more readily than in some prior schemes.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out computational-model determination or operation as described herein, e.g., for file-analysis or malware-detection purposes.

In some examples, computing devices 102(1)-102(N) in cluster 106 can, e.g., share resources, balance load, increase performance, or provide fail-over support or redundancy. Computing devices 104 can additionally or alternatively operate in a cluster or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, or network connectivity are provided (for example, through a rental agreement) over a network, such as the Internet. As used herein, the term "computing" used with reference to computing clusters, nodes, and jobs refers generally to computation, data manipulation, or other programmatically-controlled operations. The term "resource" used with reference to clusters, nodes, and jobs refers generally to any commodity or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space or mounting/unmounting services, electrical power, etc. Cloud resources can be provided for internal use within an organization or for sale to outside customers. In some examples, computer security service providers can operate cluster 106, or can operate or subscribe to a cloud service providing computing resources.

In other examples, cluster 106 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

Network(s) 108 can include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX.

As noted above, network(s) 108 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Different networks have different characteristics, e.g., bandwidth or latency, and for wireless networks, accessibility (open, announced but secured, or not announced), or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations

Figure 2:
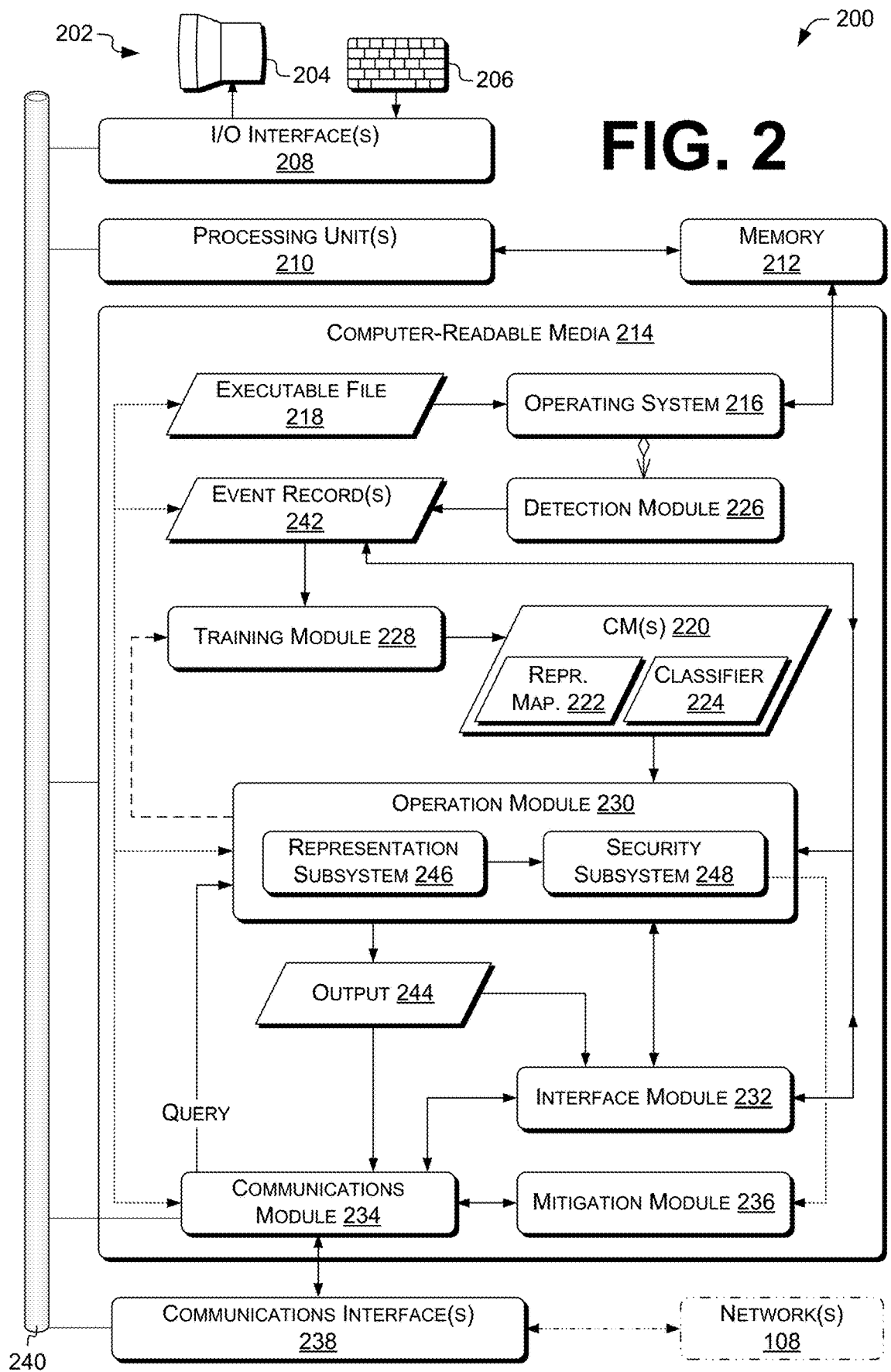
FIG. 2 is a block diagram depicting an example computing device configured to participate in performing security analysis of events according to various examples described herein.

FIG. 2 is an illustrative diagram that shows example components of a computing device 200, which can represent computing device(s) 102 or 104, and which can be or implement a security-analysis or security-event user-interface system, device, or apparatus, according to various examples described herein. Computing device 200 can include or be included in a system or device for determining or operating a computational model, analyzing events, or permitting interaction with events via a user interface, as described herein. In some examples, computing device 200 can be or include at least a portion of a computer-security system.

Computing device 200 can include or be connected to a user interface (UI) 202. In some examples, UI 202 can be configured to permit a user, e.g., entity 110, 122 or a computational-model (CM) administrator, to operate the CM(s) 114 or to place other techniques herein into service, or to control or otherwise interact with cluster 106 or computing devices 102 therein. Accordingly, actions such as presenting information of or corresponding to an output of a CM 114 to entity 110, 122 can be taken via UI 202.

In some examples, UI 202 can include various types of output devices configured for communication to a user or to another computing device 200. Output devices can be integral or peripheral to computing device 200. Examples of output devices can include a display 204, a printer, audio speakers, beepers, or other audio output devices, a vibration motor, linear vibrator, or other haptic output device, and the like. Display 204 can include an organic light-emitting-diode (OLED) display, a liquid-crystal display (LCD), a cathode-ray tube (CRT), or another type of visual display (e.g., another type of electronic display). For example, display 204 can present a rendered view of a Web page served by computing device(s) 102. Display 204 can be a component of a touchscreen, or can include a touchscreen.

UI 202 can include a user-operable input device 206 (depicted as a keyboard). User-operable input device 206 can include one or more input devices, integral or peripheral to computing device 200. The input devices can be user-operable, or can be configured for input from other computing device 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like. User queries can be received, e.g., from entity 110, 122, via UI 202.

Computing device 200 can further include one or more input/output (I/O) interface(s) 208 to allow computing device 200 to communicate with input, output, or I/O devices (for clarity of the drawing, only some are depicted). Examples of such devices can include components of UI 202, such as user-operable input devices 206 and output devices such as display 204. Other examples of such devices can include power meters, accelerometers, and other devices for measuring properties of entity 110, computing device 200, or another computing device 102 or 104. Computing device 200 can communicate via I/O interface 208 with suitable devices or using suitable electronic/software interaction techniques. Input data, e.g., of user inputs on user-operable input device 206, can be received via I/O interface 208 (e.g., one or more I/O interface(s)). Output data, e.g., of user-interface screens, can be provided via I/O interface 208 to display 204, e.g., for viewing by a user.

The computing device 200 can include one or more processing unit(s) 210. In some examples, processing unit(s) 210 can include or be connected to a memory 212, e.g., a RAM or cache. Processing units 210 can be operably coupled to the I/O interface 208 and to at least one computer-readable medium 214 (CRM), e.g., one or more tangible non-transitory computer-readable media.

Processing unit(s) 210 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA (INTEL) or XILINX that includes a CPU core embedded in an FPGA fabric. These or other hardware logic components can operate independently or, in some instances, can be driven by a CPU. In some examples, at least some of computing device(s) 102 or 104, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), or hardware logic device, can be incorporated in computing device 200, while in some examples at least one processing unit 210, e.g., one or more of a CPU, GPU, or hardware logic device, can be external to computing device 200.

Computer-readable media described herein, e.g., CRM 214, includes computer storage media or communication media. Computer storage media includes tangible storage units such as volatile memory, nonvolatile memory, or other persistent, non-transitory, or auxiliary computer storage media, removable and non-removable computer storage media implemented in any technique or technology for storage of information such as computer-readable or -executable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 200.

In contrast to computer storage media, communication media can embody computer-readable or -executable instructions, data structures, program modules, or other data in a modulated data signal, such as a carrier wave, or other transmission mechanism. As defined herein, computer storage media does not include communication media.

In some examples, CRM 214 can store instructions executable by the processing unit(s) 210, or instructions executable by external processing units such as by an external central processing unit (CPU) or external processor of any type discussed herein. Any of these instructions are referred to herein as computer-executable instructions or processor-executable instructions. For example, CRM 214 can store instructions of an operating system (OS) 216. CRM 214 can additionally or alternatively store at least one executable file 218, e.g., a user program, shared library device driver executable, system-service/daemon executable, or another system component. In some examples, OS 216 can cause processing unit(s) 210 to load the computer-executable instructions from executable file 218 into a RAM or other high-speed memory, e.g., memory 212, or to otherwise prepare computer-executable instructions from executable file 218 for execution by processing unit(s) 210. Some examples, e.g., bare-metal embedded-systems configurations, can include a loader but not an OS 216. Examples herein are discussed with reference to executable file 218 and can additionally or alternatively be used for other types of files, e.g., data files.

In some examples, a "control unit" as described herein includes processing unit(s) 210. A control unit can also include, if required, memory 212, CRM 214, or portions of either or both of those. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing computer-executable instructions.

Computer-executable instructions or other data stored on CRM 214 can include at least one computational model (CM) 220, which can represent CM(s) 114, FIG. 1. CM 220 can be stored as data (e.g., parameters); as code (e.g., for testing branch points in a decision tree); or as a combination of data and code. CM 220 can include a representation mapping 222 and a classifier 224. The representation mapping 222 or classifier 224 can include a computational model, e.g., a neural network such as an LSTM shown in FIG. 3, e.g., having a cell structure shown in inset 330. Additionally or alternatively, the representation mapping 222 or classifier 224 can include at least some parameters of a CM, e.g., LSTM parameters such as those shown in inset 330 or logistic-classifier parameters discussed herein. Additionally or alternatively, the representation mapping 222 or classifier 224 can include a lookup table (e.g., a matrix), e.g., determined based at least in part on (e.g., extracted from) a trained computational model. The term "mapping" refers to a change of domain and does not require (although it does permit) that representation mapping 222 include a LUT, hash table, or similar structure.

Computer-executable instructions or other data stored on CRM 214 can include instructions of the OS 216, a detection module 226, a training module 228, an operation module 230, an interface module 232 (which can represent a user-interface subsystem), a communications module 234, a mitigation module 236, or other modules, programs, or applications that are loadable and executable by processing unit(s) 210. Processing unit(s) 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 or 104 to perform operations described herein with reference to the OS 216 or the above-listed modules 226-236.

For brevity, discussions of functions performed "by" module(s) (or similar terms) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s). Various aspects herein may be embodied as computer program products including computer-readable program code ("program code") stored on a computer-readable medium, e.g., a tangible, non-transitory computer-readable medium.

In some examples not shown, one or more of the processing unit(s) 210 in one of the computing device(s) 102 or 104 can be operably connected to CRM 214 in a different one of the computing device(s) 102 or 104, e.g., via communications interface 238 (discussed below) and network 108. For example, program code to perform steps of flow diagrams herein, e.g., as described herein with reference to modules 226-236, can be downloaded from a server, e.g., computing device 102(1), to a client, e.g., computing device 104(K), e.g., via the network 108, and executed by one or more processing unit(s) 210 in computing device 104(K).

The computing device 200 can also include a communications interface 238, which can include a transceiver or other network-interface device such as a network interface controller (NIC) to send and receive communications over a network 108 (shown in phantom), e.g., as discussed above. As such, the computing device 200 can have network capabilities. Communications interface 238 can include any number of network, bus, memory, or register-file interfaces, in any combination, whether packaged together or separately. In some nonlimiting examples, the communications interface 238 consists of a network interface. A bus communications interface 238 can include, e.g., an expansion-card bus interface (e.g., PCI Express), a display bus interface (e.g., HDMI or DISPLAYPORT), or a peripheral-device bus interface (e.g., USB or THUNDERBOLT). In some examples, communications interface 238 can include a memory bus internal to a particular computing device 102 or 104, transmitting or providing data via communications interface 238 can include storing the data in memory 212 or CRM 214, and receiving via communications interface 238 can include retrieving data from memory 212 or CRM 214. In some examples, communications interface 238 can include a datapath providing a connection to a register file within a processor. For example, a first software module can load parameters into the register file via the datapath, and then and issue a function call to a second software module. The second software module can retrieve the parameters from the register file and return a result via the register file.

In some examples, the communications interface 238 can include, but is not limited to, a transceiver for cellular (3G, 4G, or other), WI-FI, Ultra-wideband (UWB), BLUETOOTH, or satellite transmissions. The communications interface 238 can include a wired I/O interface, such as an Ethernet interface, a serial interface, a Universal Serial Bus (USB) interface, an INFINIBAND interface, or other wired interfaces. The communications interface 238 can additionally or alternatively include at least one user-interface device or user interface, at least one bus such as a memory bus, datapath, or local bus, at least one memory interface, or at least one hardwired interface such as a 0-20 mA control line.

In some examples, the OS 216 can include components that enable or direct the computing device 200 to receive data via various inputs (e.g., user controls such as user-operable input device 206, network or communications interfaces such as communications interface 238, devices implementing memory 212, or sensors), and process the data using the processing unit(s) 210 to generate output. For example, the communications module 234 and communications interface(s) 238 can receive event data representing an event associated with a monitored computing device 104, e.g., as discussed herein with reference to event record 112, 242, command-line text 404, or other event data. The OS 216 can further include one or more components that present the output (e.g., display an image on a display 204, store data in memory 212, or transmit data to another computing device 102 or 104. The OS 216 can enable a user (e.g., entity 110) to interact with the computing device 200 using a UI 202. Additionally, the OS 216 can include components that perform various functions generally associated with an OS, e.g., storage management and internal-device management.

In some examples, the processing unit(s) 210 can access the module(s) on the CRM 214 via a bus 240. I/O interface 208 and communications interface 238 can also communicate with processing unit(s) 210 via bus 240. Bus 240 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses (e.g., of any of the types described herein with reference to bus communications interface 238), or any combination thereof.

In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the training module 228 and the operation module 230 can be combined in a single module that performs at least some of the example functions described below of those modules, or likewise the communications module 234 with either the training module 228 or the operation module 230, the communications module 234 and the mitigation module 236, or the communications module 234 and the detection module 226. In some examples, CRM 214 can include a subset of the above-described modules.

In the illustrated example, the communications module 234 can receive event record(s) 242, as represented by the stippled arrows. In some examples, detection module 226 e.g., running at a monitored computing device 104, can detect activity at monitored computing device 104 and determine corresponding event record(s) 242 (e.g., for event 128(1)). Examples of detection are discussed below. In some examples, communications module 234 can transmit event record(s) 242 determined by detection module 226, e.g., to cluster 106. The event records 242 can include separate training records and trial records. Additionally or alternatively, at least some of the event records 242 can be used both as training records and as trial records (e.g., initially as trial records, then later, at a time of retraining of CM 220, as training records).

In the illustrated example, the training module 228 can determine at least part of the CMs 220, e.g., the representation mapping 222 or the classifier 224. The CM(s) 220 can be determined, e.g., based at least in part on at least one training event record of the event record(s) 242, which can represent event record(s) 112. For example, the training module 228 can update parameters of a neural network, or rebuild or update a decision forest, based at least in part on event record(s) 242 or event data therein, e.g., command-line data.

Various examples of training or operation of a CM 220 can include initializing CM 220 with random parameter values, then performing gradient-descent, backpropagation, or other iterative parameter-updating techniques to update the parameter values of CM 220. Various examples train CM 220 on a set of training data, and validate performance of CM 220 on a set of validation data. Various examples then use CM 220 to evaluate test data.

In some examples, training module 228 can be configured to determine CMs, e.g., to apply NN-training techniques to determine neuron parameters of artificial neurons in the CMs. For example, training module 228 can determine CMs using a gradient-based update rule. Training module can parallelize the training of the NNs and/or other determination algorithms for CMs across multiple processing units, e.g., cores of a multi-core processor and/or multiple general-purpose graphics processing units (GPGPUs). For example, multiple layers of DNNs may be processed in parallel on the multiple processing units. Training module can train neural networks such as DNNs or RNNs using minibatch-based stochastic gradient descent (SGD). SGD can be parallelized along, e.g., model parameters, layers, and data (and combinations thereof). Other frameworks besides SGD can be used, e.g., minibatch non-stochastic gradient descent and/or other mathematical-optimization techniques.

In some examples, the training module 228 can perform a supervised learning technique or routine to determine a trained CM 220, e.g., using labeled training data. For example, the training data can include events 128, 402 or command-line texts 404 (FIG. 4) collected at monitored computing device(s) 104 or other computing device(s), together with, for each event 128, 402 or command-line text 404, a respective clean vs. dirty indication (or other classification 116 or result record 126), e.g., determined by entit(ies) 122 or by other analysis techniques. In some examples, the classification training data can include substantially equal numbers of clean and dirty samples. In other examples, the classification training data can include a number of clean samples that is substantially different from the number of dirty samples. In some examples, the number of clean samples in the classification training data is higher than the number of dirty samples (or vice versa), e.g., by about 5%, about 10%, or about 15%.

Figure 4:
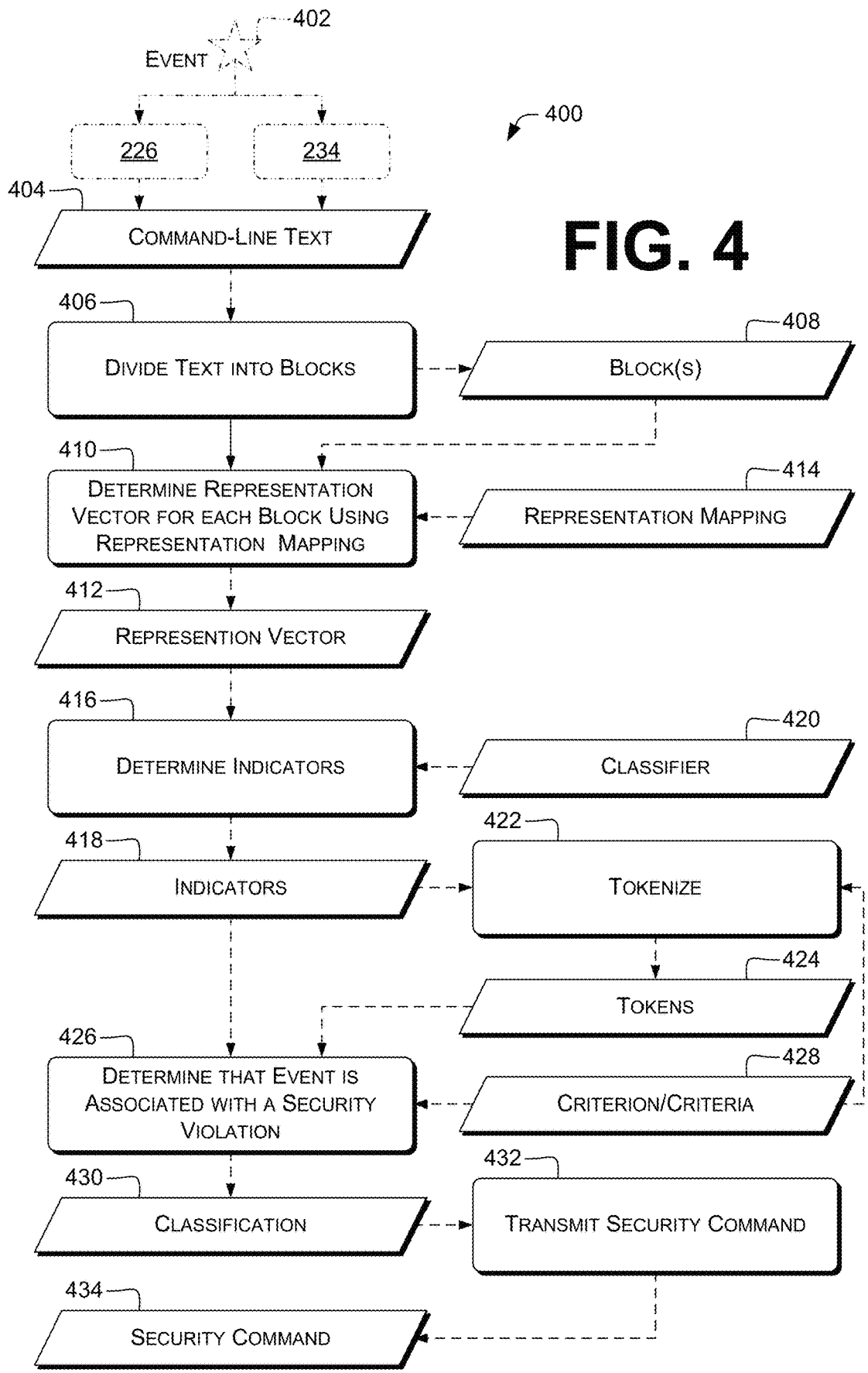
FIG. 4 is a dataflow diagram that illustrates example techniques for performing security analysis of events, e.g., to determine whether an event is associated with a security violation, and for responding to detected security violations.

The classification training data can include duplicate data samples or not. In some examples, the classification training data includes at most one occurrence of any particular event 128, 402. In some examples, the classification training data includes at most one occurrence of any particular command-line text 404 (FIG. 4). In some examples, the classification training data includes at most one occurrence of any particular (per-process) command line. In some examples, the classification training data includes at most one occurrence of any particular command-line text for each monitored computing device 104 on which that command-line text was detected. Examples are discussed herein, e.g., with reference to FIG. 4.

In some examples, the classification training data includes, per label (e.g., per classification 116), at most one occurrence of any particular command-line text 404, or of any particular (per-process) command line (e.g., per command line of the command lines in command-line text 404). For example, the command line "whoami" (or other particular command-line text 404) may occur exactly twice in classification training data: a first time in association with a clean event 128, and a second time in association with a dirty event 128.

In some examples, the training module 228 can perform an unsupervised learning technique or routine in addition to or instead of a supervised learning technique or routine. For example, unsupervised learning can be used to train a representation mapping 222, and supervised learning can be used to train a classifier 224 to determine output(s) 244 (discussed below) based on values produced by representation mapping 222.

The training module 228 can determine the trained CM 220 to output classifications 116 or other outputs 244, e.g., with at least a predetermined level of accuracy, for the classification training data. In some examples, the training module 228 can perform minibatch-based training, e.g., with randomly-selected minibatches of the classification training data. In some examples, the training module 228 can run at least one training epoch, then validate using a validation set. In some examples, the training module 228 can test performance of the CM 220 on the validation set during training to reduce the probability of overfitting. Even if the CM 220 is very accurate on the training data, the training module 228 may retrain or adjust the CM 220 if the CM 220 is not very accurate on the validation set.

In some examples, training operations, e.g., gradient-descent epochs, can be repeated as long as accuracy on the validation set is improving as training proceeds, and can terminate when accuracy on the validation set ceases to improve as training proceeds. This can permit detecting overfitting, e.g., when accuracy on the validation set ceases to improve. Avoiding overfitting can permit determining CMs that have a higher probability of successfully determining whether events are associated with security violations, even for command lines not represented in the training data ("unseen samples"). In some examples, the number of epochs can be between 100 and 300, or between 100 and 500.

In some examples, training operations described herein can be carried out on a schedule, e.g., weekly or monthly; on expiration of a predetermined validity period of CM(s) 220; or when an accuracy of CM(s) 220 has degraded to a predetermined threshold. The number of inputs, input sets, or operation units shown herein is not limiting; the number shown can be used, or more than the number shown can be used, for any input, input set, or operation unit, or any combination of those shown.

In some examples, the CMs 220 include decision trees or forests, or other types of CM described herein with reference to CM(s) 114. Training module 228 can train trees or forests via recursive partitioning, boosting, bagging, RANDOM FOREST or xgboost training, or other techniques for building decision trees based, e.g., on feature values in classification training data. In some examples of regression trees, each leaf can hold a numerical value, e.g., of +1 to indicate association with a security violation, or −1 to indicate lack of such an association. Other values can be used, e.g., zero and one. In some examples of classification trees, each leaf can include an output, e.g., a bit or other discrete value, indicating whether the corresponding term subset is considered by the corresponding decision tree to be clean or dirty.

Various examples operate on characters of text received in event records 242, e.g., event-data values 312 such as characters of command-line text 404. Command lines can be divided into characters, e.g., bytes, UNICODE code points (as encoded, e.g., in UTF-8 or UTF-16), or code points in other encodings. Some examples map the characters (e.g., using a LUT) into an encoding, e.g., one-hot, for use in CMs 220. In some examples, the training module 228 uses a corpus of command-line texts 404 to perform unsupervised training of a representation mapping 414 or supervised training of a classifier 224. In some examples, no stopword processing or stemming is applied to the term corpus (or to command-line texts 404 when analyzed as described herein with reference to FIG. 4).

The term corpus can include, e.g., terms extracted from data collected by a security service system, e.g., data of benign- or malicious-process command-line text (e.g., command-line text 404). In some examples, the term corpus can include individual command lines, or groups of command lines (e.g., grandparent/parent/child concatenated as discussed herein with reference to command-line text 404).

In the illustrated example, the operation module 230 can operate the CM 220 based at least in part on, e.g., at least one trial event record of the event record(s) 242, to provide an output 244. Output 244 can represent, e.g., classification 116 or another indication of whether an event is associated with a security violation.

In some examples in which the CM 220 includes a decision tree, the operation module 230 can perform successive tests for specific characteristics while traversing the decision tree. In some examples in which the CM 220 includes a decision forest, the operation module 230 can perform successive tests for specific characteristics while traversing each decision tree, and can provide a classification 116 or other output 244 indicating, e.g., the mode (most common) of the results of traversing the trees, or a summation of the individual decision values of each tree. In some examples of classification, each leaf can include respective weight values for one or more classes. The operation module 230 can sum the weights for each class over all the trees and pick the class with the highest total weight as classification 116 or another output 244. In some examples, the operation module 230 can apply a logistic or other squashing function, e.g., to each weight before summing or to the sums of the weights.

Figure 3:
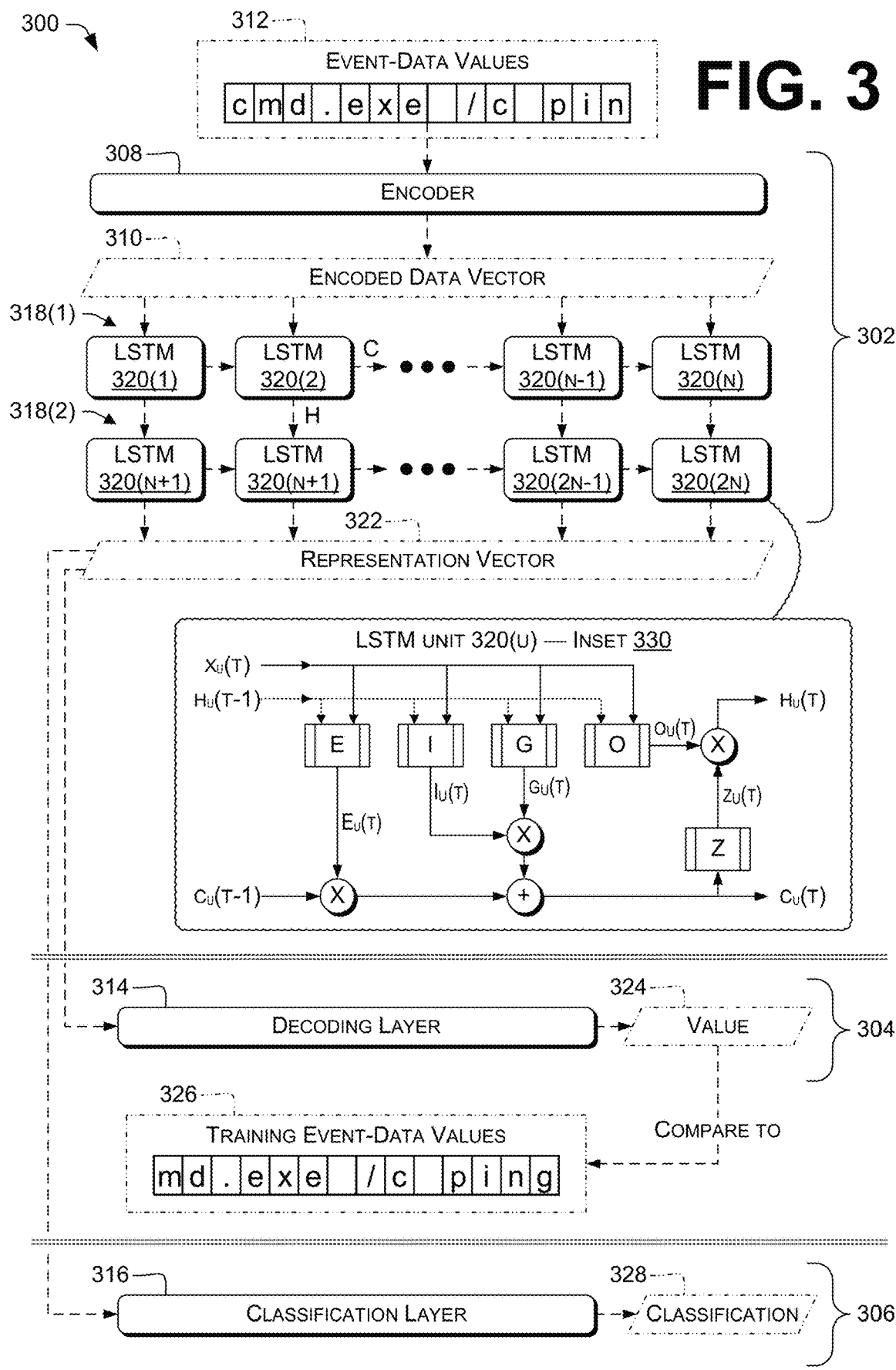
FIG. 3 is a structural diagram of some example computational models, and shows related data.

In some examples, the CMs 220 include NNs, e.g., DNNs. An NN can include a softmax, threshold, clipping, clamping, or other operation to output(s) from neuron outputs of the output layer or the last hidden layer, although this not required in some examples. In some NN examples, the operation module 230 can operate CM 220 at least partly by applying multiplication, summing, and activation functions to successive layers of the NN. Operation module 230 can provide the outputs of each layer, transformed based on edge weights, as inputs to the next layer. Examples are shown in FIGS. 3 and 4.

Output 244 is shown as stored in CRM 214. Output 244 can additionally or alternatively be stored in memory 212 or another processor-accessible storage device, e.g., a transmit buffer of communications interface 238. In some examples, CM 220 can be configured to provide a classification 116 for any type of event. In other examples, CM 220 can be configured to provide a classification 116 for events known to be of a particular type. For example, separate CMs 220 can be determined and operated for malware-related events and for targeted-attack events.

In some examples, the training module 228 or the operation module 230 can operate the CMs 220 based at least in part on training event record(s) 112 of a validation set to evaluate the performance of the CMs 220. At least one of the CMs 220, can then be updated based on the evaluation. The dashed arrow from operation module 230 to training module 228 depicts coordination between those modules. Alternatively, the evaluation and updating can both be performed by the training module 228.

In some examples, the interface module 232 can present representations of event record(s) 242 or output(s) 244, e.g., via UI 202. Additionally or alternatively, interface module 232 can receive indications of tag(s) or other data, e.g., via UI 202. Interface module 232 can then associate events with those tag(s) or other data items, e.g., by updating event record(s) 242. Examples are discussed herein, e.g., with reference to FIG. 1.

In some examples, the communications module 234 can provide an indication of the output 244, e.g., via the communications interface 238. For example, the indication can be transmitted to a computing device 104, e.g., via network(s) 108. Examples are discussed herein, e.g., with reference to at least FIG. 4, indicators 418. In some examples, communications module 234 can additionally or alternatively receive the executable file 218 (or another data stream) via the communications interface 238.

In the illustrated example, the mitigation module 236 can receive an indication that an event 128 is associated with a security violation, or an indication of a mitigation action to take. The indication can be, e.g., output 244. The mitigation module 236 can then take action to reduce negative effects a dirty process, data stream, or other system component related to the event 128 may cause. For example, the mitigation module 236 can terminate process(es), delete or quarantine file(s), or trigger a reboot. Additionally or alternatively, mitigation module 236 can take action to monitor a security violation in more detail (e.g., to collect stack traces or profiling data of a process) in order to permit more effectively reducing the negative effects of that security violation. In some examples, the mitigation module 236 can take a mitigation action (e.g., in response to security commands 434) based at least in part on the monitored computing device 104. For example, a mitigation action on a honeypot computing device 104 can be to increase the detail of data collection, while a mitigation action on a home PC computing device 104 can be to kill malicious processes. This can permit cluster 106 to process data from both types of computing devices 104 using the same or similar techniques, which can increase processing speed and efficiency at cluster 106. In some examples, mitigation module 236 can be included in or associated with OS 216. For example, mitigation module 236 can run at ring zero (on x86 processors) or another high-privilege execution level.

In some examples, the mitigation module 236 can quarantine a file or other data stream (e.g., indicated in a security command 434, FIG. 4). The file or data stream can be, e.g., a data stream associated with a dirty event 128). For example, the mitigation module 236 can move, rename, archive, or encrypt, the data stream, or otherwise prevent the data stream from being, e.g., loaded or accessed. The mitigation module 236 can additionally or alternatively alter or remove settings, e.g., registry keys or /etc/inittab entries, to prevent OS 216 from loading the data stream. Additionally or alternatively, the mitigation module 236 can terminate a process, e.g., a process associated with a dirty event 128.

In some examples, the operation module 230, the communications module 234, or another module stored in CRM 214 can be configured to receive inputs, e.g., via user-operable input device 206 or from a filesystem, transmit corresponding queries to a computing device 102, receive responses from computing device 102, and present the responses, e.g., via display 204. Examples include, e.g., Web-browser interfaces using AJAX or COMET to transmit queries and receive responses. In some examples, the operation module 230, the communications module 234, or another module stored in CRM 214 (e.g., a module in communication with UI 202) can be configured to receive tags or other information, e.g., via UI 202, and to associate one or more event record(s) 242 with the tag. In some examples, a computing device 102 executes at least one of modules 228, 230, 232, and 234, and a computing device 104 executes at least one of modules 232, 234, and 236. In some examples, one or more computing device(s) execute module 228, and one or more different computing device(s) execute module 230.

In some examples, any of the above-noted modules can be configured to receive inputs and to determine or operate CM(s) 114, 220 or perform other analyses using instructions of operation module 230 based at least in part on those inputs, e.g., to determine an output 244. In some examples, computer-executable instructions on CRM 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

In some examples, operation module 230 (or another module of computing device 200) includes a representation subsystem 246 and a security subsystem 248. In other examples, computing device 200 excludes one of, any number of, or all of, subsystems 246-248. In the illustrated example, subsystems 246-248 are shown as components of operation module 230. In some other examples, some functions of training module 228 or other modules described herein are included in at least one of subsystems 246-248. In some examples, subsystems 246-248 are combined, or the functions of subsystems 246-248 are apportioned between them in ways different than described in at least one example herein.

In some examples, representation subsystem 246 can be configured to determine indicators 118 associated with characters of command-line text. In some examples, security subsystem 248 can be configured to determine whether an event is associated with a computer-security violation, and to provide indications or security commands (e.g., to mitigation module 236), or perform tagging, in response.

In some examples, a computer-security system includes one or more first computing device(s) 200 representing computing device(s) 102 and one or more second, different computing device(s) 200 representing monitored computing device(s) 104. Detection module 226 can be, include, or be part of a security agent executable on the monitored computing device and configured to send at least some of the event data in event records 112, 242 via a network interface (e.g., communications interface(s) 238) to a network interface (e.g., communications interface(s) 238) of computing device(s) 102. In some examples, computing device(s) 102 can add data to an event or trigger additional event(s) based on the event data received from monitored computing device(s) 104.

In the illustrated example, detection module 226 (e.g., a security agent running on computing device 104) can detect events and provide corresponding event records 242. Additionally or alternatively, communications module 234 (e.g., running on a computing device 102) can receive event records 242 describing events. In some examples, communications module 234 can receive queries 124 for processing by operation module 230. Communications module 234 can provide to a computing device 120 or other query-originating device(s) the result record(s) 126, e.g., including or representing output(s) 244.

In some examples, event records 242, queries 124, result records 126, or other data described herein, can be transmitted, e.g., via HTTP requests transmitted over TCP connections. For example, an HTTP request conveying a record, e.g., in a body of the request, can also include a URL parameter, HTTP cookie, or other data carrying identifying information or credentials associated with the record. Result records 126 and other data herein can be carried in an HTTP response header or body, or other response to a request or unprompted transmission.

In some examples, detection module 226 can include a kernel-level security agent (e.g., part of OS 216, as shown) or a user-level security agent. In various embodiments, the kernel-level security agent can be installed on the host computing device in the form of a driver. For example, a driver or other implementation of detection module 226 can use hooks or filter drivers, or monitor memory or log files, as discussed below.

In some examples, the kernel-level security agent can operate on computing device 104 as a virtual machine/shadow OS. The kernel-level security agent can load before the OS 216 of the host computing device, e.g., very early in the boot-time of the host computing device, by some of the first few dozen instructions in some examples. Pre-boot components of detection module 226 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, the detection module 226 can be received from or operable with a security service. Such a security service may be implemented as a cloud of security service devices, e.g., cluster 106, referred to herein as a "security service cloud" or a "remote security system." The security service cloud can, e.g., install the detection module 226 on the computing device 104; receive event records 242 or other notifications of observed events from the detection module 226; perform analysis of data associated with those events; perform, direct, or trigger mitigation actions at computing device(s) 104; or generate configuration updates and provide those updates to the detection module 226. These or other interactions between the kernel-level security agent and the security service cloud can enable a detection loop that defeats the malware update loop of adversaries, such as malware developers.

In some examples, detection module 226 can include various components, e.g., various software modules. Components can include collectors, filters, routers/dispatchers, or event consumers. Collectors can receive notifications of events (e.g., file writes and launching executables) from host OS hooks or filter drivers, from user-mode event monitors, or from threads monitoring log files or memory locations. Filters can filter data of these events, e.g., to remove the need to perform further processing on clean events. Routers/dispatchers can provide data from the filters to event consumer(s), such as correlators or actor components. A correlator component notes the fact of the occurrence of the filtered events. An actor component may, for example, gather forensic data associated with an event and provide an event record 242 including the forensic data.

In various embodiments, a collector may register with a hook or filter driver offered by the OS 216 to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 226. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 226 may include user mode collectors to observe events that may not be visible to kernel mode processes. Such events could include, for example, rendering of display graphics for display on a display screen of the computing device 104. To observe these events, the detection module 226 is further configured to load user mode collectors as user-mode modules of the computing device 104. Like the kernel-mode collectors described above, user mode collectors may observe multiple kinds of events or activities, or each kind may be associated with a different user mode collector. The events observed by the user mode collectors may be specified by a configuration of the detection module 226. In some embodiments, the user mode collectors observe all user mode events on the computing device 104 and the configuration specifies configurable filters for filtering and dispatching the events. In other embodiments, the configuration specifies which user mode collectors should be loaded to observe specific types of events. In yet other embodiments, the configuration both specifies which user mode collectors should be loaded and configurable filters for filtering and dispatching those events.

In some examples, the detection module 226 (e.g., running at a monitored computing device 104 or in cluster 106) can build and maintain a model representing chains of execution activities and genealogies of processes. This model can be used to track attributes, behaviors, or patterns of processes executing on the computing device 104 and can enable an event consumer to determine when an event should be reported to the operation module 230 for evaluation. Upon determining an occurrence of such an event, the event consumer can perform any or all of: updating the situational model and performing further observation; generating an event record 242 to represent the determination that an event has occurred; notifying the security service cloud of the event (e.g., by transmitting event record 242 to the security service cloud, e.g., in cluster 106); or performing, directing, or triggering mitigation actions at computing device 104 (e.g., halting execution of a process associated with a security violation). In various embodiments, any or all of the observing, filtering, routing/dispatching, or utilizing of event consumers may occur in parallel with respect to multiple events.

In some examples that detect events based on chains of execution activities of the host computing device and other data described herein, rather than on fixed signatures, the kernel-level security agent is able to effectively detect processes associated with malicious code. While adversaries can easily change malware to avoid signature-based detection, it is significantly more difficult to avoid detection by an agent (e.g., detection module 226) that monitors and analyzes events. Cluster 106 (e.g., operation module 230 thereof) can process events from multiple computing devices 104 to detect more complex patterns of malicious activity.

FIG. 3 shows structures of computational models 300 according to various embodiments, and related data (shown in phantom). The illustrated models 300 are illustrative and not limiting. For example, the specific numbers of units and other hyperparameters described herein can be varied to provide a model meeting desired performance targets for particular training datasets.

Models 300 include a representation model 302, a decoder model 304, and a classification model 306. For clarity, the depictions of models 302-306 are separated in the figure by dashed double lines. In some examples, representation mapping 222 comprises representation model 302. In some examples, classifier 224 comprises representation model 302 and classification model 306. In some examples, representation model 302 is trained in conjunction with decoder model 304.

Representation model 302 includes an encoder 308 that receives an event-data value, e.g., a character of command-line text. Encoder 308 produces an encoded data vector 310 representing that event-data value. In some examples, each event-data value is selected from a universe $\mathbb{U}$ of possible event-data values. For example, the universe can consist of the 7-bit ASCII values, in which case $|\mathbb{U}|=128$, or can consist of the UNICODE 12.0 (or other version) assigned code points, in which case $|\mathbb{U}|=277575$. In some examples, encoder 308 takes an encoded value (e.g., ASCII) as input (and can include, e.g., a map from 7 binary inputs for ASCII or 21 binary inputs, for UNICODE, to n outputs). In other examples, encoder 308 takes a one-hot value as input. For example, encoder 308 can include a fully-connected layer having IP inputs (e.g., one-hot) and n outputs, e.g., implemented as a $|\mathbb{U}|\times n$ (or $n\times|\mathbb{U}|$) matrix.

In the illustrated example, event-data values 312 include characters "c", "m", "d", . . . , Encoder 308 produces a first encoded data vector 310 for "c", a second encoded data vector 310 for "m", and likewise for any other event-data values input to representation model 302. In some examples, encoder 308 receives characters or other event-data values, e.g., in ASCII or UTF32 encodings, and produces a one-hot encoded data vector 310 for each character or other event-data value. In some examples, encoder 308 is a trained model that outputs a respective floating-point vector for each character or other event-data value.

In some examples, decoder model 304 includes a decoding layer 314 that has as its domain the range of the encoder 308, and as its range the domain of the encoder 308. For example, decoding layer 314 can include a fully-connected layer or an $n\times|\mathbb{U}|$ (or $|\mathbb{U}|\times n$) matrix that provides a value in $\mathbb{U}$ corresponding to an n-element input vector. In some examples, decoding layer 314 or decoder model 304 can include a softmax unit or other unit that selects one of several possible outputs from decoding layer 314 corresponding to the output vector. For example, decoding layer 314 can include IP outputs from a softmax unit. Decoder model 304 can select the highest-valued output from the softmax output as representative of the output value, e.g., as a one-hot output. Decoder model 304 can then map from the one-hot output to an ASCII value, code point, or other element of $\mathbb{U}$ as output from decoder model 304.

In some examples, classification model 306 includes a classification layer 316. Classification layer 316 can include, e.g., a fully-connected layer mapping from n inputs to two outputs representing, respectively, clean and dirty. Classification layer 316 can include or be followed by a softmax or other operation to provide probabilities associated with each possible output of classification model 306. Other classifiers can be used, or the number of outputs can be more than two, in various examples.

Representation model 302 includes at least one layer of RNN units. In the illustrated example, representation model 302 includes two layers 318(1), 318(2) of LSTM units 320(1)-320(2n) (individually or collectively referred to herein with reference 320), layer 318(1) having LSTM units 320(1)-320(n) and layer 318(2) having LSTM units 320(2n+1)-320(2n). In some examples, each layer 318 has the same number of LSTM units (or other RNN units) 320. In other examples, at least two layers 318 differ from each other in the number of LSTM (or other-RNN) units 320 in each. In some examples, the output of the encoder 308 has a different number of elements than the input to the decoder model 304; in other examples, those vectors are the same size.

As shown, within each layer 318, each LSTM unit 320 outputs a "C" value to its neighbor in that layer 318, and an "H" value to the next layer 318 or as output (discussed below). For example, the C and H values can be floating-point, fixed-point, or integer values, and can be real or complex numbers. During operation of representation model 302, one character or other event-data value at a time is provided to encoder 308. The LSTM units 320 are operated to update their C and H outputs. In some examples, for each character, LSTM units 320(1)-320(n) are operated, and then, subsequently, LSTM units 320(n+1)-320(2n) are operated. In some examples, unit 320(u) takes $C_u(t-1)$ as input (e.g., as shown). In some examples, unit 320(u) takes $C_{u-1}(t-1)$ as input (e.g., instead of $C_u(t-1)$).

The outputs of the last layer 318 of RNN units, in this example layer 318(2), form respective elements of an n-element representation vector 322. Representation vector 322 represents (e.g., determined based at least in part on) the character or other event-data value most recently provided to representation model 302, in the context of the preceding characters. For example, representation model 302 may provide a different output for the character "e" in "the" than for the character "e" in "fantastique". In some examples, representation vector 322 has n=4096 elements.

During training of representation mapping 222, representation model 302 and decoder model 304 can be used together. Representation vector 322 can be provided to decoder model 304, which can provide a character or other event-data value 324 corresponding to representation vector 322. Training module 228 can then compare event-data value 324 to a corresponding training event-data value 326 and update parameters of representation model 302 or decoder model 304, e.g., as discussed below. In the illustrated example, representation mapping 222 is trained to predict, based on a first event-data value 312, a second event-data value (in training event-data value 326) that follows (e.g., immediately follows) the first event-data value 312.

During training or operation of classifier 224, representation model 302 and classification model 306 can be used together. Representation vector 322 can be provided to classification model 306, which can output a classification 328 (which can represent all or part of a classification 116, indicator 118, result record 126, or output 244). In some examples, during training of classifier 224, parameters of representation model 302 are fixed (e.g., constant), and only parameters of classification model 306 are updated. In some examples, during use of classifier 224, parameters of both representation model 302 and classification model 306 are fixed. Examples are discussed below.

Inset 330 (wavy box/arrow) shows components of each LSTM unit 320 in the depicted example. Within inset 330, all arrows represent dataflow. This discussion is in terms of a single LSTM unit 320(u) for brevity. However, the illustrated operations can be carried out in matrix form on multiple LSTM units 320 at a time.

LSTM unit 320(u), at a particular time step t (e.g., while processing the $i^{th}$ character or other event-data value of a sequence of such values) takes as input the current value $x_i(t)$ from encoded data vector 310 or a previous LSTM unit 320, an H value $h_u(t-1)$ from the previous time step (e.g., the output of LSTM unit 320(u) after processing the previous, $(t-1)^{th}$ character) and a C value $c_u(t-1)$ from the previous time step. LSTM unit 320(u) outputs an $h_u(t)$ value to be provided to later layers or to be incorporated into representation vector 322, and a new C value $c_u(t)$ for use in the next time step. LSTM unit carries out multiplication (circled X) and addition (circled plus) operations, and carries out labeled operations as in Eqs. (1)-(3). In some examples of Eq. (1) that use artificial neural networks, W variables are weights and b variables are biases. In Eqs. (1)-(3), σ( ) represents the sigmoid activation function.

$$E: e_u(t)=\sigma(W_{ie}x_u(t)+b_{ie}W_{he}h_u(t-1)+b_{he})\ I: i_u(t)=\sigma(W_{ii}x_u(t)+b_{ii}+W_{hi}h_u(t-1)+b_{hi})\ G: g_u(t)=\tan h(W_{ig}x_u(t)+b_{ig}+W_{hg}h_u(t-1)+b_{hg})\ O: o_u(t)=\sigma(W_{io}x_u(t)+b_{io}+W_{ho}h_u(t-1)+b_{ho})\ Z: z_u(t)=\tan h\ c_u(t) \quad (1)$$

$$c_u(t)=e_u(t)c_u(t-1)+i_u(t)\mathrm{j}g_u(t) \quad (2)$$

$$h_u(t)=o_u(t)z_u(t)=o_u(t)\tan h\ c_u(t) \quad (3)$$

Various examples herein sequentially provide individual characters or event-data values to model structures or trained models. Some of these examples can include evaluating mathematical relationships defined by a model structure, such as Eqs. (1)-(3), with input variable(s) (e.g., $x_u(t)$) being set to values determined by the individual character or event-data value under consideration. Accordingly, as used herein, sequentially providing input data to a model structure or trained model to determine or receive output data can include repeatedly operating the model structure or trained model based on one value of input data at a time, and storing or otherwise processing output data produced by the model structure or trained model when operated.

Training of representation mapping 222 (e.g., including representation model 302) can be performed using techniques described herein with reference to FIGS. 3 and 4, e.g., minibatch SGD with backpropagation through time. In some examples, representation model 302 can be trained in conjunction with decoder model 304. In some examples, event-data values 312 and training event-data values 326 are divided into blocks of B values each, e.g., B=32, 64, or 128.

For each block, each of the B event-data values (e.g., characters) is used in a respective RNN-training timestep (a particular t value) in inset 330. On each timestep, 4096 (or another number of) LSTM units 320 (e.g., 4096) are run (e.g., in parallel or in series) to provide the hidden-layer output. Subsequently, another 4096 (or another number of) LSTM cells 320 are run (e.g., in parallel or in series) to provide an output to the decoder model 304. The decoding layer 314 (e.g., a 4096×128 matrix) or other component(s) of decoder model 304 outputs a predicted event-data value, e.g., a prediction of the next letter in a block drawn from command-line text or other text.

In some examples, a single event-data value is provided, encoded in a one-hot encoding, e.g., of dimension 128 (or other size of the set of permissible characters or other event-data values), to encoder 308. Encoder 308 feeds first layer 318(1), which in turn feeds second layer 318(2) (e.g., having the same configuration as layer 318(1)). An output layer (e.g., decoder model 304) maps from the 4096-element vector from layer 318(2) to a 128-element vector (or other vector sized per the permissible character-set size), e.g., representing probabilities associated with the probabilities of the characters (or other event-data values) in the permissible set. In some examples, the predicted event-data value is selected as that one of the characters (or other event-data values) in the permissible set for which the value in the 128 vector is the highest, or has the largest magnitude.

An error is determined between the predicted event-data value and a reference event-data value. The error can be, e.g., two-valued (match/no-match) or multi-valued/continuous/floating-point (e.g., differences in predicted probabilities), for example. The errors, or gradients computed from those errors, can be accumulated over the course of a block or a minibatch, and then model parameters updated based on the aggregate errors. The errors/

In the illustrated example, the training data include event-data values 312 representing some characters of a command line, namely "cmd.exe/c ping". The training event-data values 326 include, for each character, the immediately following character of the command line. For example, with an input event-data value 312 of "/", the training event-data value 326 is "c". The error is determined based on whether the predicted value for the input "/" following "cmd.exe" matches "c".

In some examples, backpropagation is used to update parameters of the decoder model 304, the RNN (e.g., LSTM) layers 318, and the encoder 308. For example, errors and gradients can be accumulated for each of the B characters in a block, running backwards in timestep (e.g., from the last character back to the first), such as in backpropagation-through-time techniques. At least some of the parameters can then be updated using the accumulated gradients. In some examples, the PYTORCH library is used, and the PYTORCH autograd module's tensor.backward ( ) function is used to determine the gradients. The parameters can then be updated by subtracting the gradients or a fraction thereof.

In some examples, the representation mapping 222 is trained using the following hyperparameter values: block size=64 input characters and 64 output characters; character set of 128 characters (e.g., ASCII), or 128+3 (for padding, unknown, and end-of-string); minibatch size=64 blocks; hidden size=4096 neurons (e.g., per layer); 2 hidden layers; sequence length=64; embedding layer 128×4096; 1500 epochs; clip=0.25 (for gradient clipping); dropout rate=0.5; optimizer=optim.Adam(model.parameters ( ) lr=1e-3); criterion=nn.CrossEntropyLoss ( ). In some examples, the classifier 224 is also trained using some or all of these hyperparameter values. In some examples, the representation mapping 222, the classifier 224, or both, are trained using PYTORCH, e.g., using gradient descent, SGD, or minibatch SGD.

Classifier 224 can be trained by training module 228. In some examples, after training the representation model 302 (e.g., including the encoder 308 and the RNN layers 318, or other hidden layers) together with the decoder model 304, the decoder model 304 can be disconnected from the representation model 302. The classification model 306, e.g., including a logistic layer that maps 4096 inputs to two classes (clean, dirty), can be operated in conjunction with the trained representation model 302, taking input from the outputs of layer 318(2). Training can be performed to determine parameters of the logistic layer, e.g., classification layer 316, or other parameters of classification model 306. The representation model 302 can be fixed (parameters held constant or substantially constant, or otherwise not modified or not substantially modified) during training of the classifier 224. Supervised training can be carried out using respective command-line texts associated with each desired classifier output (e.g., clean/dirty). Training can be performed using training techniques, loss functions, and other details described herein with reference to representation mapping 222.

In some examples, classification training data includes a plurality of portions of a set of event-data values, e.g., blocks of characters or other event-data values. The classification training data also includes, for each portion (e.g., each block), a training indicator (e.g., +1 for dirty vs. 0 or −1 for clean, in some examples). At the beginning of the processing of each block, state values of the representation model 302 (e.g., the $c_u(t)$ values, $h_u N(0)$ values, or both, of inset 330) are reset, e.g., set to zero or another predetermined initialization value. Note that one or more of (e.g., all of) the parameters of the representation model 302 are not reset even though one or more of the state value(s) are reset.

In some examples, the characters or other event-data values of a block (e.g., 64 characters) are then fed into the trained representation model 302 as successive time steps, e.g., as discussed above. After all characters have been fed in, the $h_u(B)$ (e.g., $h_u(63)$ or $h_u(64)$) outputs from the representation model 302 (e.g., from each of the LSTM units 320(n+1)-320(2n)) in layer 318(2) are assembled into a representation of (e.g., a 1×4096 float vector representing) that block. The classifier is then trained to map from that representation to the corresponding training indicator (e.g., a clean/dirty indicator or other member of a set of output classes). Accordingly, classifier 224 training is at least partly supervised. In some examples, $h_u(1)$-$h_u(63)$ (or other $h_u$(B−1)) values are disregarded during training of classifier 224. Using the hu values after the last timestep of the block permits the cu values developed while feeding the characters of the block into the representation model 302 to affect the $h_u(i)$ values, which can improve the sensitivity of the classifier 224 to the context in a set of event data.

In some examples, each indicator in the classification training data is associated with a training block, not with individual characters in that training block. However, the classifier 224 so trained can be used on a character-by-character basis to produce indicators associated with individual characters of a trial block.

In some examples, one or more transformation matrices are used in, or in addition to, the components shown. For example, encoder 308 can include or be followed by a 128×4096 matrix; layer 318(1) can be followed by a 4096×4096 matrix; layer 318(2) can be followed by a 4096×4096 matrix; classification model 306 can include a 4096×2 matrix; or any combination thereof.

Illustrative Techniques

FIG. 4 is a dataflow diagram that illustrates example techniques 400 for determining an indication of whether an event is associated with a security violation, e.g., by performing representation, dimensionality-reduction, and clustering operations, and related dataflow (shown dashed for clarity). Example functions shown in FIG. 4 and other flow diagrams and example techniques herein can be implemented on or otherwise embodied in one or more computing device(s) 102 or 104, e.g., a computing device 200, e.g., using software running on such device(s), e.g., software executed by processing unit(s) 210. Accordingly, the discussion of techniques 400 contemplates performance of the techniques, systems configured to perform the techniques, or computer-readable media (e.g., computer storage media) comprising instructions executable by at least one processor to cause the at least one processor to perform the techniques.

For the sake of illustration, the example techniques 400 are described below with reference to processing unit 210 and other components shown in FIGS. 1 and 2 that can carry out or participate in the steps of the example techniques (e.g., a control unit), and with reference to data structures shown in FIGS. 1 and 2. However, other processing unit(s), such as processing unit(s) 210 or other components of computing device(s) 102 or 104, can carry out step(s) of described example techniques such as techniques 400. Similarly, example technique(s) shown in FIGS. 5-12 may also be, but are not limited to being, carried out by any specifically-identified components.

The order in which the operations are described in each example flow diagram or technique is not intended to be construed as a limitation, and any number of the described operations can be combined in any order or in parallel to implement each technique. In each flow diagram, fewer than all of the depicted operations can be performed, except as expressly noted. In some examples, any illustrated block can be followed, or can be directly followed, by any block illustrated as being subsequent to that block through one or more arrows, unless otherwise indicated (e.g., by data dependencies between blocks).

Moreover, the operations in each of FIGS. 4-12 can be implemented in hardware, software, or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions, e.g., sections of the hardware of an FPGA- or ASIC-based control unit.

Operations in FIGS. 4-12 can be performed by modules or subsystems described herein with reference to FIG. 2. Alternatively, the number or arrangement of modules or subsystems performing functions described herein may be different from that shown in FIG. 2. Accordingly, references to specific modules or subsystems performing operations described herein are for clarity, and also envision other modules or subsystems that may perform those operations.

For clarity of explanation, the operations of FIG. 4 are described in terms of batch processing. However, this is not limiting, and the operations of any of FIGS. 4-12 can be performed in a streamed or pipelined manner, or any combination of batch, stream, and pipelined processing. FIG. 4 is described in terms of a single event 128 for brevity, but this is not limiting; operations of technique 400 can be performed for each event (or for at least some events) of a plurality of events 128.

In some examples, detection module 226 running on a computing device 102 or 104 detects a plurality of events. Each event is associated with a monitored computing device 104. For brevity, only one event 402 (which can represent an event 128) is shown. Event 402 is associated with a monitored computing device 104, whether it was detected at that monitored computing device 104 or was a composite event (e.g., event 128(2)) generated based at least in part on activity detected at that monitored computing device 104. In some examples, event 402 is associated with a process that has an ancestor process, e.g., a parent, grandparent, &c.

Detection module 226 can produce event record(s) 242 (FIG. 2) including event data describing the events 402. Additionally or alternatively, communications module 234 can receive the event records 242. Each event record 242 can include respective command-line text 404 associated with the event 402. In the illustrated example, techniques 400 are used to determine whether event 402 is associated with a security violation, or to determine dirty portions of command-line text 404.

In some examples, an event record 242 can include data indicating an event type of the respective event 402. Event types are described herein for clarity using natural language, but can be identified in at least some software or hardware implementations using enumerated values, abbreviated text strings (e.g., reverse domain names), or other forms. Non-limiting example event types can include, e.g., "process created," "file opened," "network connection established," or "DNS request made." In some examples, events 402 of these types are detected by computing device 104. Further nonlimiting example event types can include "grandchild process spawned," "signature match," or other event types of events 402 detected based on information collected over time or supplemental information (e.g., an antivirus database) used in addition to sub-event data from computing device 104. In some examples, events 402 of these event types are detected by computing device(s) 102.

In some examples, monitored computing device 104 sends event records 242 to cluster 106 representing process-launch sub-events. For example, an event record 242 representing a process-launch sub-event can include the command line of the launched process, a process ID (PID) of the launched process, and a process ID (PPID) of the parent of the launched process. Cluster 106 uses the PID and PPID to record relationships between processes. Cluster 106 can receive a process-launch sub-event and determine the number of processes in the chain beginning with the launched process and ending with the root process (e.g., init(8), the System process, PID 4, on a WINDOWS system, smss.exe, dwm.exe, wininit.exe, or winlogon.exe) running on the monitored computing device 104. If the number is ≥3 (e.g., a grandchild of the root process, or farther down) (or ≥k, for predetermined integer k>1), cluster 106 can trigger an event 402 (which can represent event 128(2)) for processing as described herein. That event can have an event type of "process having parent and grandparent started" or similar.

Further example events 128, 402 can include or represent occurrences of at least one of the following, and can be indicated by corresponding event types.

Creating a process, for example, creating of a command line interface (CLI) process;

Creating a thread;

Creating a remote thread (i.e., creating a thread in another process), for example, dynamic-link library (DLL) injection or other thread injection, which is an action that can be used to escape one process and pivot to another process;

Creating a new script (e.g., batch file, shell script, VISUAL BASIC script, or POWERSHELL script);

Creating a new executable (e.g., creating a portable executable (PE));

Accessing another process and reading from its memory or writing to its memory;

Creating a service (e.g., a service can be used to start a process or to start a process every time system is rebooted);

Modifying a service binary (e.g., changing portable executable files on disk instead of writing them);

Writing a dump file;

Decreasing security of a registration key or industry key;

A suspicious raw disk read; or

Privilege escalation in some contexts (e.g., User Account Control requests for elevation).

The "creation" events discussed above may be examples of events triggered while malware is dropping code on a monitored computing device. The actions discussed above may only trigger events when certain objects commit them. For example, when an Internet browser plug-in thread is compromised, activities such as CLI creation, process migration, installation, or PE creation and execution may be indicative of compromise of the Internet browser plug-in thread by a security violation. Moreover, an identity of an object that originated an action itself may determine whether or not an action taken by the monitored computing device triggers an event. For example, some plugins and processes are more susceptible to vulnerabilities and are therefore used for security violations more often. Actions taken by, or regarding, those plugins or processes may therefore trigger events.

Throughout this document, an event record 242, or any other record described herein, can include one or more fields, each of which can have a name or other identifier, and each of which can include or be associated with one or more values. For example, event record 242 or other records herein can be represented as ASN.1-defined data structures, GOOGLE protobufs, JSON records, XML documents or subtrees, associative arrays, or other forms of tagged or key-value storage. Examples of fields can include, but are not limited to, timestamps, filenames, filehandles, userids (e.g., Windows SIDs), groupids, process identifiers, session identifiers, process command lines, command-line histories, universally unique identifiers (UUIDs), operating-system identifiers, e.g., from uname(1), permissions, access-control lists (ACLs), login types (e.g., with or without secure attention sequence), timestamps, blocks of data (e.g., headers or full contents of files or of regions of memory), hashes of data (e.g., of the blocks of data, such as file contents), IP or other network addresses (e.g., of computing device 104 or peers with which it is communicating or is attempting to communicate), network port numbers (e.g., local or remote), identifiers of detection module 226 (e.g., a version number), values from the registry, dotfiles, or other configuration data (e.g., crontab entries), call-stack entries, domain names (e.g., relative or fully-qualified, FQDN), names or other identifiers of mutexes, named pipes, or other inter-thread communication or inter-process communication (IPC) mechanisms, or counts (e.g., of VIRUSTOTAL dirty indications).

In some examples, field values associated with an event 402 indicating an action taken or attempted by a process can report the corresponding values before the action, after the action, or both (e.g., filename before or after a rename, or both). In some examples, field values can include the results of applying transform(s) to any of the above, e.g., to smash case or otherwise filter or preprocess the data. In some examples, an event record 242 can include information about a process that is currently running on the computing device 104, or that has previously run on the computing device 104. In some examples, an event record 242 can include information about at least one currently-running process and at least one related process (e.g., still running or already terminated), e.g., a parent process of the currently-running process.

In some examples, at least one event type can be associated with an event 402 that only occurs when a specific OS 216 is running on the computing device 104 (e.g., WINDOWS-only events or MAC OS X-only events). In some examples, at least one event type can be associated with events 402 that occur on multiple operating systems 216 (e.g., events that can occur on any OS providing a POSIX-compliant API). In some examples, an event type can indicate at least one of the following types of events 402: a user logging on or off, the detection module 226 starting up or shutting down, a process being created, a network name being looked up (e.g., via DNS), a network connection being initiated or established (e.g., IPv4 or IPv6), a value in an auto-start extensibility point (ASEP) being created or modified, an executable being created, modified, or deleted, a critical system file being modified, a file of a specific type or extension being created or updated (e.g., based on a database listing the specific type(s) or extension(s) to be monitored), a new scheduled process or daemon being registered or otherwise set up to execute at a future time or on a schedule, or a process making or attempting an access to a portion of a disk, memory, or other system resource not allocated to that process.

In some examples, command-line text 404 is included in an event record 242 (e.g., in a field thereof) or other data associated with the event 402. Command-line text 404 can include at least one command line associated with event 402. Additionally or alternatively, command-line text 404 can include at least two command lines associated with event 402. For example, command-line text 404 can include a first command line associated with a first process, and a second command line associated with an ancestor (e.g., parent, grandparent, . . . ) process of the first process.

In some examples, the at least two command lines (in command-line text 404) associated with the event 402 can include command lines of first, second, and third processes. The first process can be a process that triggered the event 402. The second process can be a parent process of the first process. The third process can be a parent process of the second process, i.e., a grandparent process of the first process. In some examples, the command-line text 404 comprises the concatenation of the first-, second-, and third-process command lines in a predetermined order (e.g., third-, then second-, then first-process, or vice versa, or any other order). For example, a remote-desktop host (third, grandparent process) may spawn a shell (second, parent process) (e.g., cmd, POWERSHELL, or sh), which in turn spawns a process (first process) selected by the user of remote-desktop services.

To form command-line text 404, multiple (e.g., any number of) command lines may be concatenated. In some examples, the command lines may be concatenated with predetermined separators between them, e.g., a single space, a run of horizontal whitespace (qr {\h+}), a run of arbitrary whitespace (qr {\s+}), or a predetermined padding or separator marker. Example padding/separator markers can include, e.g., the modified UTF-8 representation 0xc0 0x80 for U+0000, U+0030 INFORMATION SEPARATOR TWO (IEC 6429 Record Separator), U+0080 (PAD), or another control character (e.g., a C0 or C1 control code). An end-of-string marker (e.g., 0x00, U+0003 END OF TEXT, U+0085 NEXT LINE, U+009C STRING TERMINATOR, or another control character) can be appended to the concatenated command lines in forming command-line text 404. In some examples, any character of command-line text 404 outside a predetermined character set can be replaced by an "unknown character" marker, e.g., U+FFFD REPLACEMENT CHARACTER, U+001A SUBSTITUTE, U+0091 PRIVATE USE ONE, another control character, or a predetermined non-control character such as "?". In some examples, the character set comprises the ASCII characters from 0 to 127, a padding marker, an unknown-character marker, and an end-of-string marker. Any or all of the padding marker, the unknown-character marker, and the end-of-string marker can be bytes having values>127, or other values that do not overlap with the non-markers in the character set.

At 406, the representation subsystem 246 can divide command-line text 404 into blocks 408 of characters, e.g., 32, 64, or 128 characters (non-power-of-2 sizes can additionally or alternatively be used). For example, representation subsystem 246 can divide command-line text 404 into adjacent blocks 408 of ≤c characters, e.g., c=64. If command-line text 404 has <c characters, only one block 408 may be output. At least one block 408 (e.g., the first or last block) may have <c characters if the total length of command-line text 404 is not a multiple of c characters. Some examples divide the entirety of the command-line text 404, e.g., including two or more (e.g., three) command lines, into blocks 408.

At 410, the representation subsystem 246 can determine a respective representation vector 412 for each block 408. Each representation vector 412 can be determined based at least in part on at least a portion of (e.g., one block of) the command-line record 404. Representation vector 412 can have a first number of elements, e.g., ≥100 elements. In some examples, representation vector 412 is the output of an LSTM hidden layer such as layer 318(1) or 318(2).

Operation 410 can include determining the representation vectors 412 based at least in part on a trained representation mapping 414 (e.g., trained by training module 228), which can represent representation mapping 222. Representation mapping 414 can include a one-hot layer or other encoding unit (such as encoder 308 or an input to encoder 308). Additionally or alternatively, representation mapping 414 can include one or more RNN layers (e.g., layers 318), e.g., multiple LSTM layers (e.g., including LSTM units 320).

For example, representation model 302, together with decoder model 304, can be trained on a document corpus including representative command lines or other command-line text, e.g., as discussed herein with reference to FIG. 3. The representation mapping 414 can be or include a portion (e.g., weights or other parameters before the decoding layer) of the parameters of the trained model. For example, representation mapping 414 can include at least a portion of, or all of representation model 302, and can exclude at least a portion of, or all of, decoder model 304. In some examples, the corpus includes ≥10,000 terms (or ≥20,000, ≥30,000, ≥40,000, ≥50,000, ≥100,000, or ≥1,000,000). In some examples, the corpus includes samples of command-line text 404 that are associated with both clean events and dirty events.

The representation mapping 414 can receive characters as input, e.g., in the form of text in the ASCII, CP437, UTF-8, one-hot, or another encoding. The representation mapping 414 can include an internal lookup (e.g., a hash table or intern, such as encoder 308) to map from terms in the text to one-hot or other (e.g., trained) representations for input to representation models or other mappings, such as RNN layers 318. In some examples, the internal lookup can map any term not included in the corpus to a predetermined "unknown-term" representation. Alternatively, the representation mapping 414 can receive encoded (e.g., one-hot or other) representations of terms. In some examples, the representation mapping 414 is or includes a lookup table (LUT), e.g., a LUT implementation of encoder 308. The LUT can store a trained matrix mapping from one-hot or other-encoding character inputs to vector representations (e.g., a 128×4096 matrix). In some examples, more than half of, >90% of, or all of, the data stored in trained representation mapping 414 is determined computationally rather than being determined directly by human mental activity. In some examples, representation mapping 414 includes the embedding layer, and the two LSTM layers, shown in FIG. 3.

In some examples, the one-hot representation has a single 1 value among 95 (printable ASCII), 98 (printable ASCII+ padding, unknown, end-of-string), 128 (all ASCII), or 131 (128+padding, unknown, end-of-string) values. In some examples, the one-hot representation has 128 values, of which not all are used. For example, 98 (as above) of the 128 values can be used.

In some examples, operation 406 is not used. In other examples, operation 406 is used, and operation 410 includes sequentially providing the characters of a block to trained representation mapping 414, and then resetting trained representation mapping 414 (e.g., resetting the $c_u(0)$ and $h_u(0)$ values, Eq. (1)) before processing the next block.

At 416, the representation subsystem 246 can determine a respective indicator 418 for each of the c characters in each block 408 of the command-line text 404 associated with event 402. Operation 416 can be performed based at least in part on a classifier 420 (which can represent classifier 224) (e.g., a logistic classifier including a classification model 306). Examples are discussed herein, e.g., with reference to FIG. 3. In some examples, indicators 418 are included in a result record 126 or output 244. Additionally or alternatively, indicators 418 can be processed to determine whether event 402 is associated with a security violation.

In some examples, the $i^{th}$ indicator 418 can include a binary or other enumerated value indicating which classification 116 is associated with the $i^{th}$ character. Additionally or alternatively, the $i^{th}$ indicator 418 can include a numerical value (e.g., integer, fixed-point, or floating-point) indicating classification and strength of association with that classification. In some examples, the $i^{th}$ indicator 418 is on [−1,+1], where −1 indicates "clean" and +1 indicates "dirty" with respect to the $i^{th}$ character. Values can take on intermediate values, e.g., +0.8 indicates a stronger "dirty" classification than +0.5, but both are still "dirty" (as opposed to "clean") classifications. Similarly, other ranges can be used, e.g., −1 for "dirty" and +1 for "clean", or ±2 or other values than 1, with appropriate modifications to techniques described below.

In some examples, to determine an indicator for a character in a block, for each character in the block (e.g., 64 characters) in order, that character of the block is fed through the trained model stack (representation mapping 414 and classifier 420), as in FIG. 3 (e.g., representation model 302 and classification model 306). Each character can correspond with an LSTM timestep (t value in inset 330). The output of classifier 420 after processing each character is recorded in association with that character. The model is then reset (e.g., all $c_u(I)$ are zeroed out or otherwise re-initialized) before the next block. In some examples, the indicators for more than one, or all, of the characters in the block are determined in a particular pass through the block. For example, for a block with T characters (or other event-data values) x(1) . . . x(T), value x(1) is passed through the model to determine indicator 1, then value x(2) is passed through the model to determine indicator 2, . . . , then value x(T) is passed through the model to determine indicator T In some examples, discussed above, classifier 420 is trained on blocks of data. However, classifier 420 can still be used on a character-by-character basis to determine characters (or other event-data values) associated with security violation(s).

At 422, the representation subsystem 246 or the security subsystem 248 can tokenize command-line text 404 based at least in part on at least one indicator 418, e.g., all the indicators 418 from at least one block 408, at least one indicator 418 from each of two or more blocks 408, or all indicators 418 from all blocks 408 of command-line text 404. Operation 422 can output data of one or more tokens 424. Tokenization can be based on one or more criteria 428, e.g., a threshold level.

As used herein, the term "token" refers to a contiguous sequence of characters that satisfy a particular property with respect to each other or to characters preceding or following the token. For example, a token can be defined as a contiguous string of non-whitespace characters adjacent at both ends to whitespace or a string boundary, in which case "abc123" has one token. In another example, a token can be defined as a contiguous string of characters having a particular UNICODE General Category, adjacent at both ends to a character of a different General Category or a string boundary, in which case "abc123" has two tokens ("abc", category Lu, and "123", category Nd).

In some examples, the tokenization operation can be carried out as in Table 1. In some examples, a "special character" is a character in a predetermined proper subset of the character set. In some examples, a special character matches qr{[^[:alnum:]]}. Some examples permit bridging across characters not indicated by indicator 418 as dirty in order to more effectively detect command-line text associated with security violation(s). Tokenization can additionally or alternatively permit detecting event data associated with a security violation based on criteria other than or in addition to per-character criteria.

TABLE 1

```
For each character:
    indicator = Classify(char) (e.g., get an indicator 418 on [-1,+1])
    if character is not special =>
        append character to current token
    else => (special char)
        if character is clean but previous character is dirty based on indicator =>
            append character to current token
        else if the character is dirty based on indicator =>
            append character to current token
        else: (special char at end of token, and preceding char, are clean)
            calculate average value of indicators of all characters in token
            return average value and token
```

In some examples, a token is considered to be dirty if the average value of the indicators 418 associated with the characters in that token exceeds (or is at least) a predetermined threshold, e.g., 0, +0.5, or +0.8. For example, the characters in the token "127.0.0.1" may have respective indicators 418 of +0.3, +0.1, +0.4, −0.1, +0.5, −0.9, +0.2, −0.6, +0.5. The tokenization above permits bridging across the negative values associated with the dots in order to provide a coherent token (in this example, an IP address). The average of the indicators 418 in the token is 0.333. This token can therefore be considered dirty if a predetermined threshold is <0.333 or ≤0.333.

At 426, the security subsystem 248 can determine that event 402 is associated with a security violation. The determination can be made based at least in part on at least one stored criterion 428, e.g., a threshold level (e.g., +0.4, +0.5, or +0.8). Examples are discussed below. Operation 426 can output a classification 430, which can represent classification 116 or another output 244. Operation 426 can be performed based on at least one indicator 418 from at least one block 408, e.g., all the indicators 418 from at least one block 408, at least one indicator 418 from each of two or more blocks 408, or all indicators 418 from all blocks 408 of command-line text 404.

In some examples, the determination at operation 426 is based on indicators 418. Additionally or alternatively, the determination at operation 426 can be based on tokens 424. Various examples are discussed in the following paragraphs.

Some examples determine that event 402 is associated with a security violation based at least in part on the number of dirty tokens 424 found (at a particular predetermined threshold, e.g., as in the 127.0.0.1 example above) or another metric derived from the indicators 418. Some examples determine that event 402 is associated with a security violation in response to event 402 being associated with command-line text 404 that has: a dirty (at a predetermined threshold) token 424 longer than k chars (for a predetermined k, e.g., k=4); or m dirty (at a predetermined threshold) tokens (for predetermined m, e.g., m=3).

Some examples store data of the number of dirty tokens 424 found or other metric(s) in association with, or as part of, event records 242. Some examples store such data, or other descriptive statistics of indicators 418 or tokens 424, at several different predetermined thresholds (e.g., the number of tokens having average scores>0, >0.5, and >0.8).

In some examples, the security subsystem 248 can determine that event 402 is dirty in response to tokens or strings from a predetermined set of tokens or strings (e.g., "hthread", "hprocess", and "writeprocessmemory") occurring in a predetermined order, or in any order, in the command-line text 404. In some examples, matching is performed case-insensitively and in any order, although this is not required.

In some examples, the security subsystem 248 can select the predetermined threshold level, e.g., by linear, binary, or other search, so that the number of dirty tokens exceeds a predetermined count, e.g., two. The security subsystem 248 can then analyze the dirty tokens. For example, the security subsystem 248 can determine that event 402 is associated with a security violation in response to detection of two dirty tokens 424 at a threshold of +0.5; two dirty tokens 424 at a threshold of +0.5, each having a length exceeding a predetermined number of characters, e.g., 3, 4, 5, 6, 7, 8, 9, or 10; or three dirty tokens 424 at a threshold of +0.4. Additionally or alternatively, the security subsystem 248 can determine that event 402 is associated with a security violation in response to occurrence of predetermined text strings in the dirty tokens 424, or in response to the dirty tokens 424 matching a predetermined pattern (e.g., a regular expression or grammar).

At 432, the communications module 234 can transmit a security command 434 to the monitored computing device 104 to cause the monitored computing device 104 to perform a mitigation action. Operation 432 can be performed in response to the determining at operation 426 that the event 402 is associated with a security violation.

In some examples, e.g., in response to receipt of the security command 434, the mitigation module 236 running at the monitored computing device 104 can perform mitigation actions. Examples of mitigation actions are described herein with reference to FIG. 2. Accordingly, in some examples, operations of technique 400 can be used together to automatically detect and mitigate malicious behavior at a monitored computing device 104.

In some examples, the security command 434 can request or direct a particular mitigation action. In at least one example, if the monitored computing device 104 is a honeypot, security command 434 can direct increased data monitoring and reporting at monitored computing device 104. If not, security command 434 can direct killing of processes or quarantining of files at monitored computing device 104.

In some examples, the security command 434 can direct monitored computing device 104 to add, remove, or modify a detection rule. For example, a security agent (e.g., mitigation module 236) running at monitored computing device 104 can scan command lines sought to be run at that monitored computing device 104, and refuse to run command lines determined to be dirty. Command lines can be determined to be dirty (e.g., malicious) based, e.g., at least in part on matching a detection rule. For example, a detection rule can specify that any command line including each term in a predetermined set of terms should be considered dirty. Detection rules can specify in-order or out-of-order matching, case-sensitive or case-insensitive matching, or other matching parameters (e.g., proximity of detected terms). In some examples, detection rules can include: regular expressions; PERL 6/Raku grammars or other recursive-descent, LL, LALR, LR, or other grammars; YARA rules; raw character or byte strings to be located; or lists of any of those.

In various illustrative examples, referring to FIGS. 3 and 4 for context, without limitation, parameters described herein with reference to FIG. 3 (e.g., 4096 units) can be used. Representation mapping 414 or classifier 420 can be trained periodically, e.g., daily, weekly, or monthly. The RNN representation mapping 414 can be initially trained on a corpus including command-line texts for both dirty events and clean events. The corpus can additionally or alternatively include command-line texts for multiple events, each of which has a classification 116 selected from among N classifications, N>2. Representation mapping 414 can be trained using 5, 10, 15, 20, or another number of iterations. Representation mapping 414 can be trained on all the characters or blocks in a command-line text, or on only the first T characters or blocks of each command-line text, e.g., T=200, T=300, or T=400. In some examples, each command-line text 404 includes multiple command lines, e.g., two, three, or more than three. In some of these examples, only the first T characters or blocks of each individual command line are used; in other examples, the entirety of at least one of, or all of, command-line text(s) 404 is (are) used. In some examples, input data can be deduplicated before it is used for training.

In some examples, a computer-security system (e.g., including a computing device 102, 200) includes a computer-readable memory (e.g., 212, 214) storing a representation mapping 222 (or 414), a classifier 224 (or 420), and a communications interface 238. The system can include a control unit configured to perform operations of FIG. 4. Some example systems configured to perform operations of FIG. 4 include an electronic display (e.g., display 204), a user-input device (e.g., user-operable input device 206), and a user-interface subsystem (e.g., interface module 232) configured to perform those operations or other operations, e.g., presenting indicators 418 via a user interface 202. For example, command-line text 404 can be presented, and characters of the command-line text 404 can be highlighted, or not, depending on the respective indicators 418. For example, dirty characters (indicator 418>0) or dirty tokens (average indicator 418>0) can be highlighted.

Figure 5:
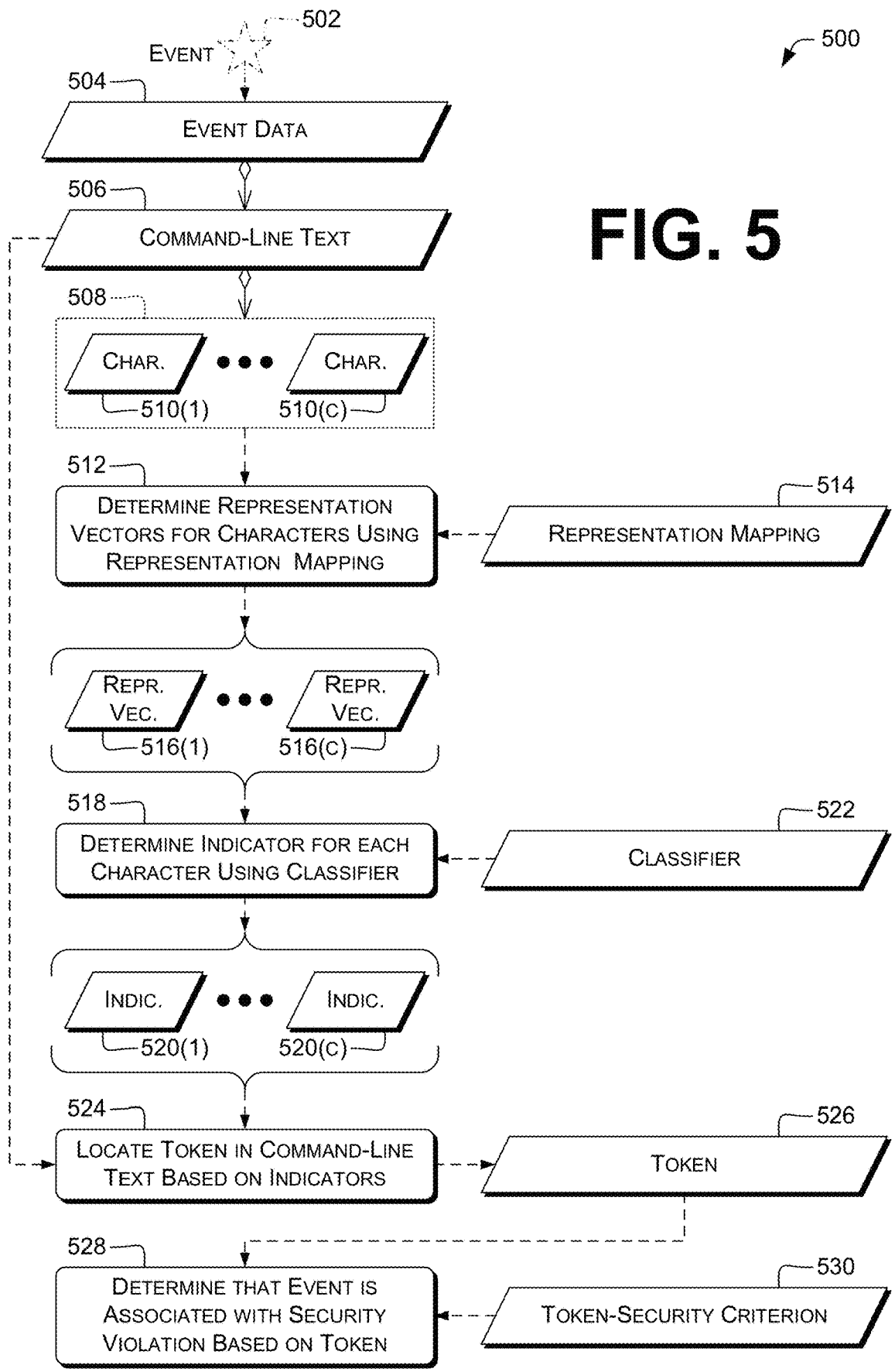
FIG. 5 is a dataflow diagram that illustrates example techniques for performing security analysis of event data, e.g., to determine whether an event is associated with a security violation.

FIG. 5 is a dataflow diagram that illustrates example techniques 500 for determining that an event is associated with a security violation, and related dataflow (shown dashed for clarity). Techniques 500 can be performed by a control unit, e.g., as discussed herein with reference to FIG. 2.

In some examples, an event 502 (which can represent event 128 or 402) being analyzed is associated with a monitored computing device 104. For example, event 502 can be an event that occurred at the monitored computing device 104, or an event generated based on activity at the monitored computing device 104 (e.g., launch of grandparent, parent, and child processes). The event 502 is associated with event data 504, e.g., as conveyed in an event record 112, 242. The event data 504 includes command-line text 506 (which can represent command-line text 404). The command-line text 506 comprises a plurality 508 of characters 510(1)-510($c$) (individually or collectively referred to herein with reference 510). In some examples, command-line text 506 can be preprocessed, e.g., to alter the length, range of characters, encoding, or other properties of command-line text 506. Additionally or alternatively, command-line text 506 can be preprocessed, e.g., to collapse consecutive whitespace, normalize case, or perform other textual alterations. Characters 510 can be represented in any encoding, e.g., those discussed above with reference to FIGS. 3 and 4.

In some examples, the command-line text 506 comprises: at least some text of a command line of a first process, the first process being a process that triggered the event 502; at least some text of a command line of a second process that is a parent process of the first process; and at least some text of a command line of a third process that is a parent process of the second process (grandparent process of the first process). Examples are discussed herein, e.g., with reference to event 402 and command-line text 404.

At 512, the representation subsystem 246 can sequentially provide characters 510 of the plurality 508 of characters 510 to a trained representation mapping 514 (which can represent representation mapping 222 or 414) to determine respective representation vectors 516(1)-516($c$) (individually or collectively referred to herein with reference 516) (which can represent representation vectors 412). Examples are discussed herein, e.g., with reference to FIG. 3 and operation 410. For example, the representation subsystem can apply each character 510($i$) in turn as input to encoder 308 (including applying a one-hot transformation, if applicable).

At 518, the representation subsystem 246 can determine, for each of the characters 510, a respective indicator 520(1)-520($c$) (any of which can represent an indicator 418) (individually or collectively referred to herein with reference 520) at least partly by applying the respective representation vector 516($c$) to a trained classifier 522 (which can represent classifier 224 or 420). Examples are discussed herein, e.g., with reference to operation 416.

In some examples, the trained representation mapping 514 comprises at least two recurrent neural network (RNN) layers, e.g., layers 318. In some examples, the trained classifier 420 comprises at least one logistic-classification unit. For example, a logistic-classification unit can include weights or biases that are applied to inputs of the unit; a unit for summing the (weighted and biased, or not) inputs; weights or biases that are applied to the resulting sum; a sigmoid, tan h, or other activation function applied to the (weighted and biased, or not) sum; or any combination thereof. For example, a logistic-classification unit can perform operations similar to those for $o_u(t)$ in Eq. (1).

At 524, the representation subsystem 246 or the security subsystem 248 can locate at least one token 526 (which can represent a token 424) in the command-line text 506 based at least in part on the respective indicators 520 of the characters 510 in the command-line text 506. Examples are discussed herein, e.g., with reference to operation 422.

At 528, the security subsystem 248 can determine that the event 502 is associated with a security violation based at least in part on the at least one token 526 satisfying a stored token-security criterion 530 (which can represent at least one criterion 428). Examples are discussed herein, e.g., with reference to operation 426. For example, given a stored tuple (N, L), the security subsystem 248 can determine that the event 502 is associated with a security violation if the at least one token 526 comprises at least N tokens, each of length≥L.

Figure 6:
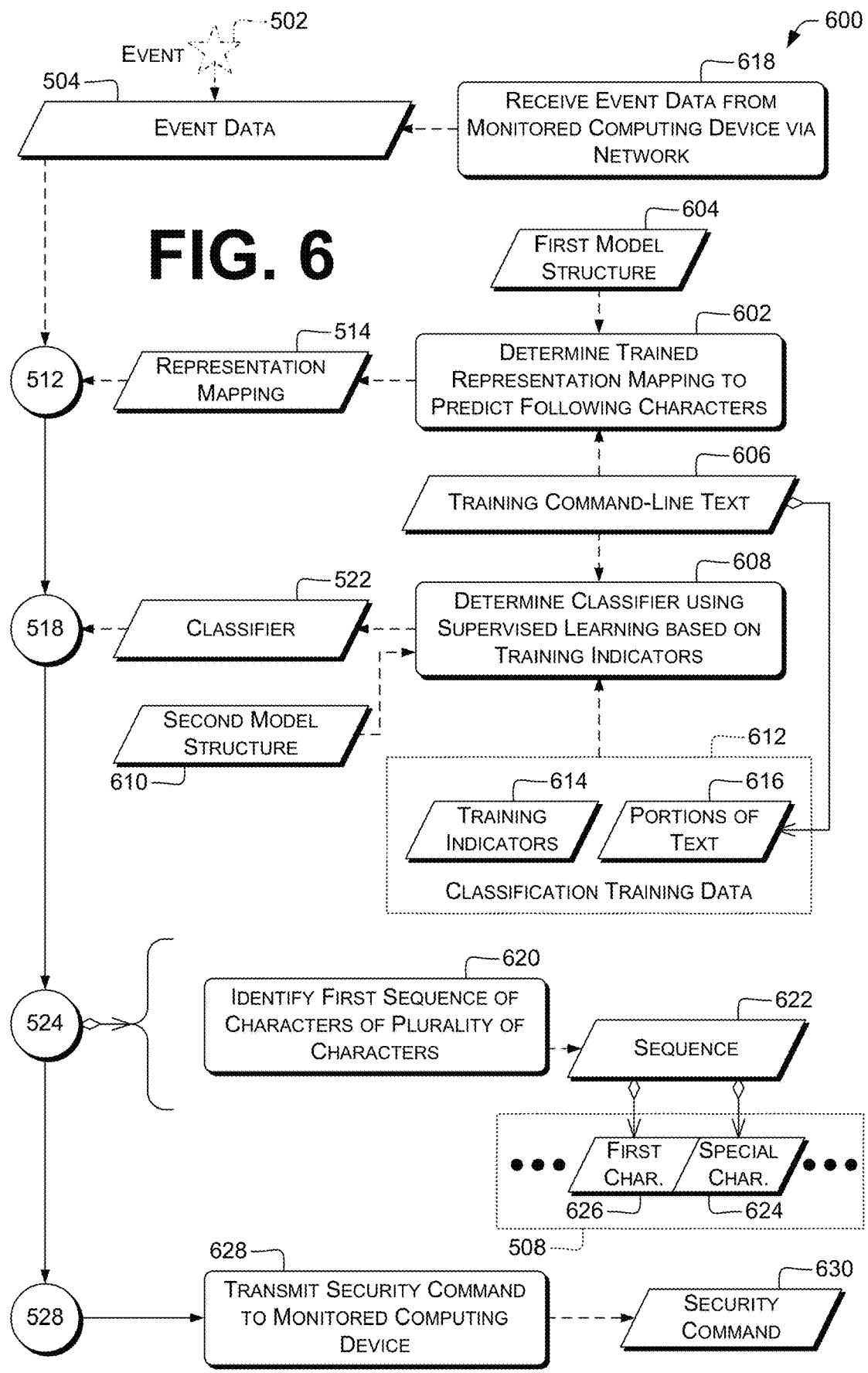
FIG. 6 is a dataflow diagram that illustrates example techniques for training computational models and conducting communications between a monitored computing device and a security-service server.

FIG. 6 is a dataflow diagram that illustrates example techniques 600 for analyzing events and interfacing between monitored computing devices 104 and cluster 106 (or another security service), and related dataflow (shown dashed for clarity). In some examples, techniques 600 can be performed by a control unit, as described herein, e.g., of a computing device 102. In some examples, operation 512 can be preceded by operations 602; operation 518 can be preceded by operation 608; operation 524 can include operation 620; or operation 528 can be followed by operation 628.

At 602, the training module 228 can determine the trained representation mapping 514 at least partly by adjusting parameters of a first model structure 604 so that the trained representation mapping 514 predicts, based on a character of training command-line text 606, an immediately following character in the training command-line text 606, within a predetermined accuracy. Examples are discussed herein, e.g., with reference to FIG. 3. For example, the first model structure 604 can include encoder 308, layers 318, and decoder model 304. The parameters of the first model structure 604 can include, e.g., a 128×4096 matrix for the decoder model 304 and weights and biases of LSTM units 320 (W and b terms in Eq. (1)).

At 608, the training module 228 can determine the classifier 522 at least partly by adjusting parameters of a second model structure 610 using a supervised learning technique based on classification training data 612 comprising training indicators 614 associated with respective portions 616 of the training command-line text 606. Examples are discussed herein, e.g., with reference to FIG. 3. For example, the second model structure 610 can include the classification model 306. The training module 228 can hold parameters of the representation mapping 414 fixed while performing operation 608, in some examples. The parameters of the second model structure 610 can include, e.g., a 4096×2 matrix mapping from the output of trained representation mapping 514 to two classes: clean and dirty.

At 618, the communications module 234 can receive the event data 504 from the monitored computing device 104 via a network 108. Examples are discussed herein, e.g., with reference to FIG. 1. For example, communications module 238 can provide a network-accessible HTTP or other API via which a security agent or other module at monitored computing device 104 can provide the event data 504. In some examples, operation 618 can include pre-processing the event data 504, e.g., to reject or modify any event data outside a predetermined set of acceptable event data. For example, characters outside the ASCII range can be replaced with a replacement character, in some examples.

At 620, the security subsystem 248 can locate the at least one token 526 at least partly by identifying a first sequence 622 of adjacent characters of the plurality 508 of characters 510. Token 526 can comprise or consist of the characters in first sequence 622.

For example, the plurality 508 of characters 510 can include at least one special character, e.g., a punctuation or spacing character. The plurality 508 of characters 510 can also include at least one non-special character, e.g., an alphanumeric character such as POSIX [:alnum:]. The determination of which characters are special can be made based on the type of command-line text 506 being processed. For example, when processing command-line text 506 for languages with sigils, sigil characters, although punctuation, may be considered non-special. When processing command-line text 506 for languages without sigils, all punctuation characters may be special characters, in some examples. The determination of which characters are special can additionally or alternatively be made based on the character set(s), encoding(s), or natural language(s) in which command-line text 506 is expressed. For example, when processing American-English text, qr{[A-Za-ZO-9]} may be non-special, whereas when processing German text, qr{[A-Za-ZO-9äööüβ]} may be non-special.

First sequence 622 can begin from a starting character 510 of the plurality 508 of characters 510, and can extend to and excluding, or to and including, a special character 624 preceded by a first character 626. Examples are discussed herein, e.g., with reference to Table 1. In some examples, the respective indicator 520 of the special character 624 indicates that the special character 624 is not associated with a security violation, and the respective indicator 520 of the first character 626 indicates that the first character 626 is not associated with a security violation. That is, in these examples, a token ends between or after two consecutive clean characters (based on indicators 418, 520), of which the second is a special character.

At 628, in response to the determining at operation 528 that the event 502 is associated with a security violation, the communications module 234 or the security subsystem 248 can transmit a security command 630 (which can represent security command 434) to the monitored computing device 104. The security command 630 can cause the monitored computing device 104 to perform a mitigation action. Examples are discussed herein, e.g., with reference to operation 432 and security command 434.

Figure 7:
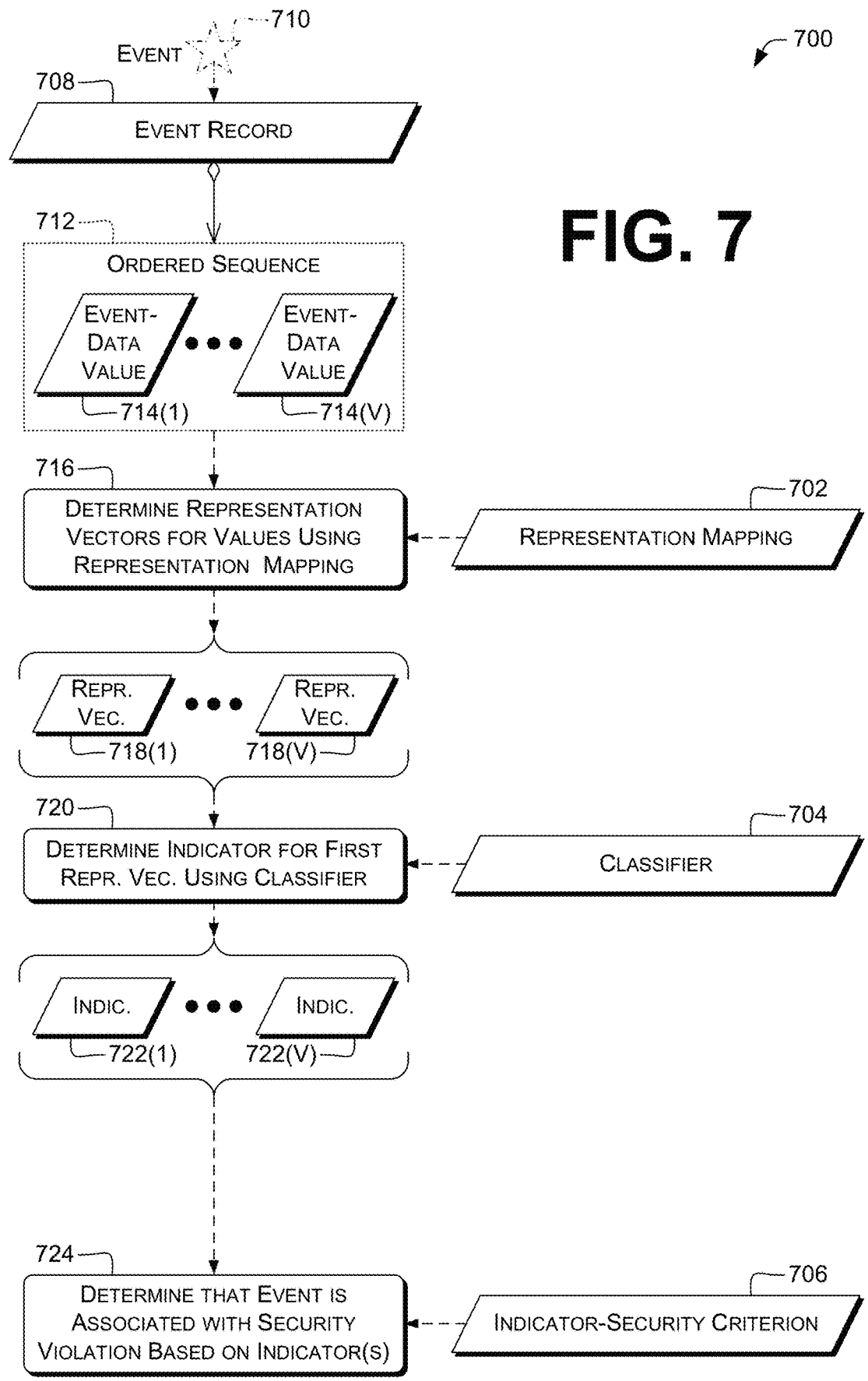
FIG. 7 is a dataflow diagram that illustrates example techniques for determining that an event is associated with a security violation.

FIG. 7 is a dataflow diagram that illustrates example techniques 700 for determining that an event is associated with a security violation, and related dataflow (shown dashed for clarity). Techniques 700 can be performed by a control unit, e.g., as discussed herein with reference to FIG. 2. Technique 700 can be performed by a system, e.g., a computing device 200, including at least one computer-readable memory, e.g., memory 212 or CRM 214, a communications interface 238, and a control unit configured to perform operations of techniques 700, e.g., by executing stored instructions.

The at least one computer-readable memory (e.g., multiple memories considered as a unit) can store a representation mapping 702 (which can represent representation mapping 222 or 414) and a classifier 704 (which can represent classifier 224 or 420). Examples of representation mappings and classifiers are described herein with reference to FIG. 3. The at least one computer-readable memory can also store an indicator-security criterion 706.

In some examples, the at least one computer-readable memory stores: the trained representation mapping 702 comprising two recurrent neural network (RNN) layers (e.g., layers 318); and the classifier 704 comprising a logistic-classification unit. Examples are discussed herein, e.g., with reference to FIG. 3 and operation 518.

The communications interface 238 can be configured to receive an event record 708 (which can represent event record 112 or 242). The event record 112, 242 can be associated with an event 710 (which can represent event 128 or 402) of a plurality of events; can be associated with a monitored computing device 104 of a plurality of monitored computing devices; and can include an ordered sequence 712 of event-data values 714(1)-714(V) (any of which can represent an event-data value 312). In some examples, ordered sequence 712 can represent plurality 508 having an order, and event-data values 312 can represent characters 510. However, this is not limiting. For example, event-data values can represent instruction pointer (IP) or program counter (PC) values collected, e.g., by a profiler or tracer during execution of code associated with event 710.

In some examples, the ordered sequence of event-data values comprises: at least one character of a command line of a first process, the first process being a process that triggered the event 710; at least one character of a command line of a second process that is a parent process of the first process; and at least one character of a command line of a third process that is a parent process of the second process. Examples are discussed herein, e.g., with reference to command-line text 404.

At 716, the representation subsystem 246 can sequentially provide at least some, or all, event-data values 714 of the ordered sequence 712 of event-data values 714 to the trained representation mapping 702 to determine respective representation vectors 718(1)-718(V). In some examples, a first representation vector 718(i) of the representation vectors is associated with a first event-data value 714(i) of the ordered sequence 712 of event-data values 714. Examples are discussed herein, e.g., with reference to operations 410, 512. For example, each event-data value 714 (possibly after mapping to one-hot or another encoding) can be provided in order to the trained representation mapping 702, and hidden-layer outputs (e.g., from representation model 302) can be determined as the representation vectors 718.

At 720, the representation subsystem 246 can determine a first indicator 722(i) at least partly by applying the first representation vector to the trained classifier. Examples are discussed herein, e.g., with reference to operations 416 or 518. In some examples, the representation subsystem 246 can determine a plurality of indicators 722(1)-722(V), of which first indicator 722(i) is one.

At 724, the security subsystem 248 can determine that the first event-data value 714(i) is associated with a security violation based at least in part on the first indicator 722(i) satisfying the indicator-security criterion 706. For example, a value of first indicator 722(i) exceeding a threshold stored in the indicator-security criterion 706 can indicate that the first event-data value 714(i) is associated with a security violation. Examples are discussed herein, e.g., with reference to operations 426 or 528. Operation 724 can additionally include determining that other event-data values 714 are associated with security violations based on the respective representation vectors 718.

Figure 8:
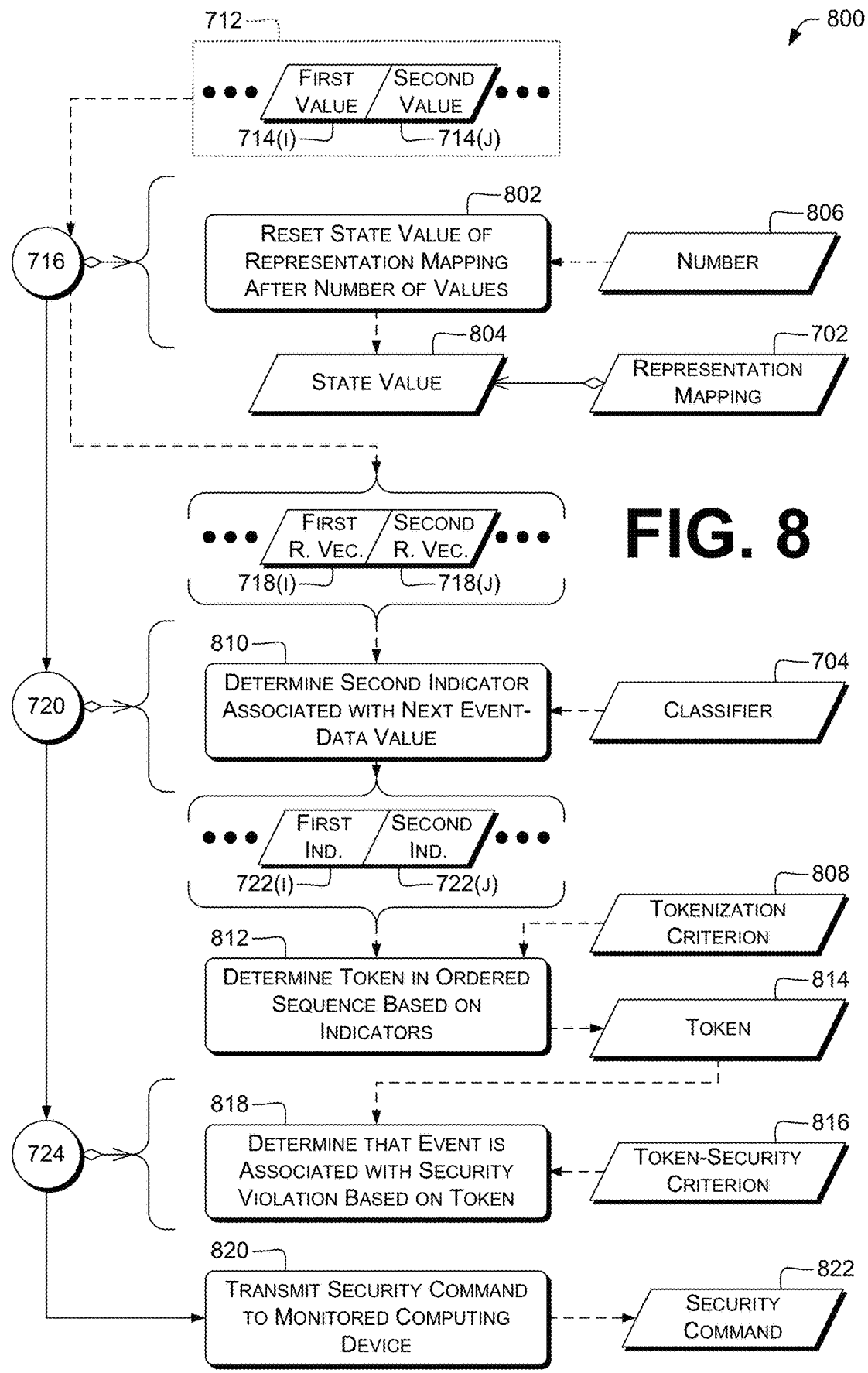
FIG. 8 is a dataflow diagram that illustrates example techniques for analyzing events and conducting communications between a monitored computing device and a security-service server.

FIG. 8 is a dataflow diagram that illustrates example techniques 800 for determining CMs, determining that an event is associated with a security violation, and interfacing between monitored computing devices 104 and cluster 106 (or another security service), and related dataflow (shown dashed for clarity). In some examples, techniques 800 can be performed by a control unit, as described herein, e.g., of a computing device 102. In some examples, operation 716 can include operation 802; operation 720 can include or be followed by operation 810; operations 810 or 812 can precede operations 724 or 818; operation 724 can include operation 818; or operation 724 can be followed by operation 820.

At 802, the representation subsystem 246 can reset a state value 804 of the trained representation mapping 702. The state value 804 can be or include, e.g., a $c_u(t)$ or $h_u(t)$ value described herein with reference to Eq. (1). Operation 802 can be performed, e.g., after providing a predetermined number 806 of the event-data values 714 to the trained representation mapping 702. For example, number 806 can be the size of a block 408 of event-data values 714. Examples are discussed herein, e.g., with reference to FIG. 3 and operations 410 and 416. Operation 802 can be performed multiple times, e.g., once per block or once between every pair of consecutive blocks.

Various examples process tokens, e.g., as discussed herein with reference to FIGS. 4 and 5. Some of these examples include operations 810 and 812. In some examples, operations 810 and 812 are used multiple times to determine a token having more than two characters, or to locate tokens in sequences longer than two characters.

In some examples, the at least one computer-readable memory stores a tokenization criterion 808. For example, the tokenization criterion 808 can be satisfied by a clean special character not preceded by a dirty character. Examples of tokenization criterion 808 are described herein with reference to Table 1.

At 810, the representation subsystem 246 can determine a second indicator 722(j) at least partly by applying a second representation vector 718(j) ("R. Vec.") of the representation vectors 718 to the trained classifier 704. In some examples, the second indicator 722(j) is associated with a second event-data value 714(j) that immediately follows the first event-data value 714(i) in the ordered sequence 712 of event-data values 714, e.g., j=i+1 for sequences using incrementing indices, or j=i−1 for sequences using decrementing indices.

At 812, the representation subsystem 246 can determine a token 814 in the ordered sequence 712 of event-data values 714 based at least in part on the first indicator 722(i) and the second indicator 722(j) satisfying the tokenization criterion 808. Examples are discussed herein, e.g., with reference to operations 422, 524, and 620.

In some examples using tokens, operation 724 includes operation 818. In some of these examples, the at least one computer-readable memory stores a token-security criterion 816. In some examples, operation 818 is used together with operation 812; in other examples, only one of operations 812 and 818 is used. In some examples, operation 818 is used together with a tokenization technique different from that of operation 812.

At 818, the security subsystem 248 can determine that the event 710 is associated with a security violation based at least in part on the token 814 satisfying the token-security criterion 816. Examples are discussed herein, e.g., with reference to operations 426 and 528.

At 820, the communications module 234 or the security subsystem 248 can transmit a security command 822 to the monitored computing device 104 to cause the monitored computing device 104 to perform a mitigation action. Operation 820 can be performed, e.g., at least partly in response to the determination at operation 724 that the first event-data value 714(1) is associated with a security violation. Examples are discussed herein, e.g., with reference to operations 432 or 628.

Figure 9:
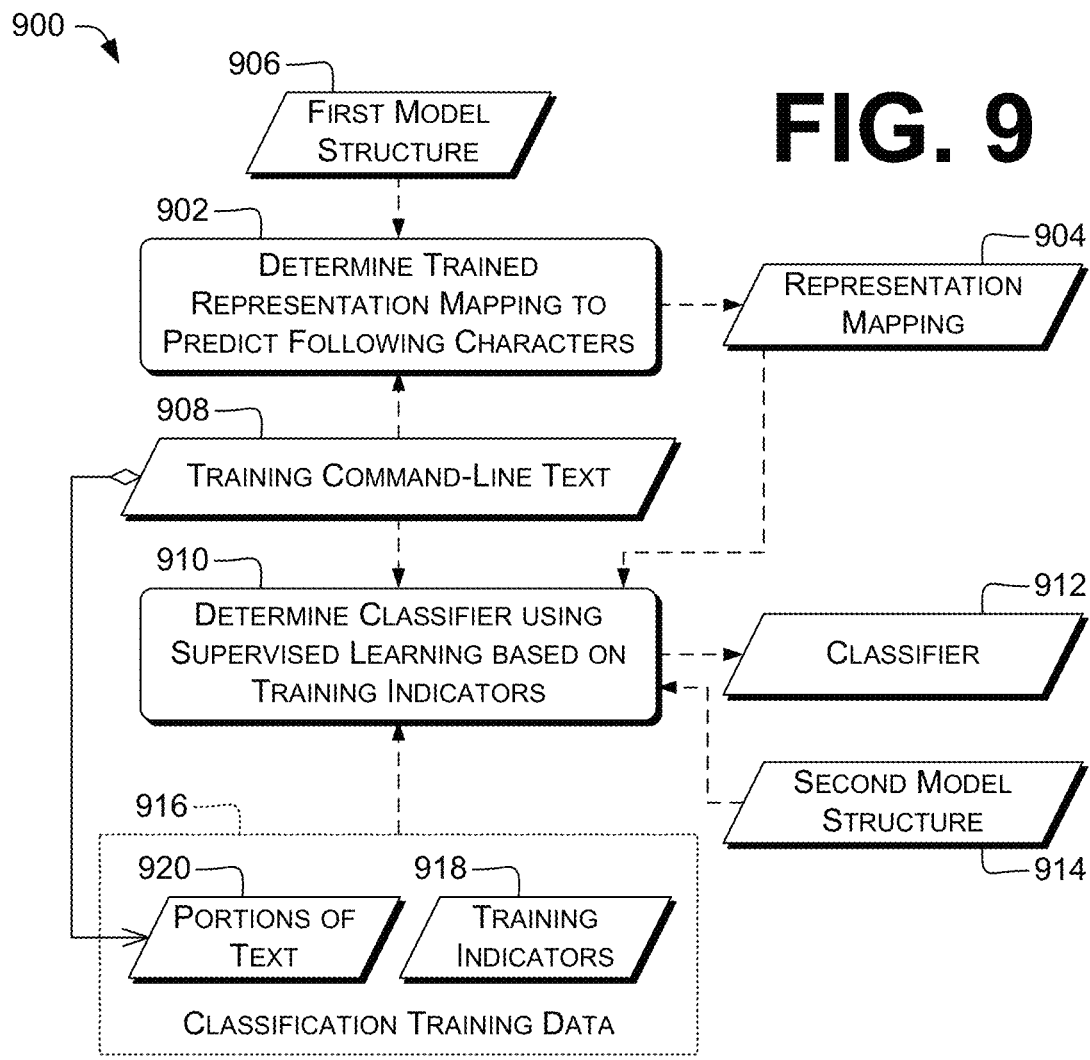
FIG. 9 is a dataflow diagram that illustrates example techniques for training computational models.

FIG. 9 is a dataflow diagram that illustrates example techniques 900 for training computational models usable, e.g., in determining that an event is associated with a security violation, and related dataflow (shown dashed for clarity). Techniques 900 can be performed by a control unit, e.g., as discussed herein with reference to FIG. 2. Techniques 900 can be embodied as instructions stored on at least one tangible, non-transitory computer-readable medium and executable by at least one processor to cause the at least one processor to perform operations of techniques 900.

At 902, the training module 228 can determine a trained representation mapping 904 at least partly by adjusting parameters of a first model structure 906 (which can represent first model structure 604) so that the trained representation mapping 904 predicts, based on a character of training command-line text 908 (or other value in event-data values 312), the immediately following character in the training command-line text 908 (or other value of training event-data values 326), within a predetermined accuracy. Examples are discussed herein, e.g., with reference to FIGS. 3 and 4 and operation 602.

At 910, the training module 228 can determine a classifier 912 at least partly by adjusting parameters of a second model structure 914 (which can represent second model structure 610) using a supervised learning technique based on classification training data 916 comprising training indicators 918 indicating whether respective portions 920 of the training command-line text 908 are associated with security violations. Examples are discussed herein, e.g., with reference to FIGS. 3 and 4 and operation 608. In some examples, the trained classifier comprises at least one logistic-classification unit. Examples are discussed herein, e.g., with reference to FIG. 3 and operation 518. In the illustrated example, operation 910 follows operation 902, and classifier 912 is determined based at least in part on trained representation mapping 904.

In some examples, the first model structure 906 comprises: an encoder (e.g., encoder 308) that receives a character of training command-line text 908; a first recurrent neural network (RNN) layer (e.g., layer 318(1)) fed by the encoder; a second RNN layer (e.g., layer 318(2)) fed by the first RNN layer; and a decoder (e.g., decoder model 304) that outputs a predicted character. In some of these examples, the trained representation mapping 904 comprises the encoder, the first RNN layer, and the second RNN layer. In some examples in which the first model structure 906 includes the decoder, the trained representation mapping 904 excludes the decoder.

Figure 10:
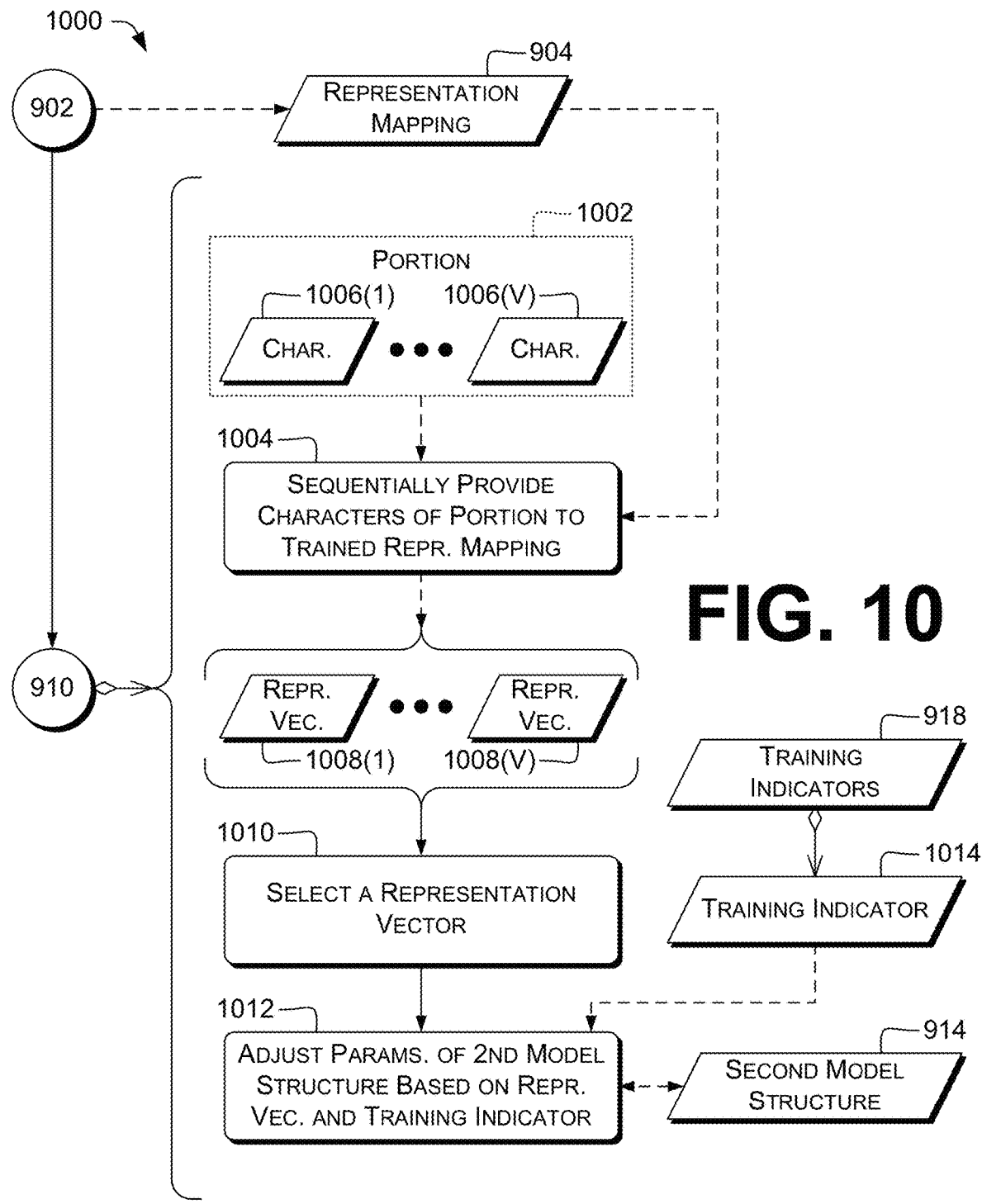
FIG. 10 is a dataflow diagram that illustrates example techniques for training a representation mapping.

FIG. 10 is a dataflow diagram that illustrates example techniques 1000 for determining CMs, e.g., for analyzing events, and related dataflow (shown dashed for clarity). In some examples, techniques 1000 can be performed by a control unit, as described herein, e.g., of a computing device 102. In some examples, operation 910 can include operations 1004-1012.

In some examples, the trained representation mapping 904 is configured to receive a sequence of characters and output respective representation vectors for the characters (e.g., one representation vector per character). Examples are discussed herein, e.g., with reference to FIG. 3 and operations 410, 512, and 716. In some of these examples, operation 910 includes applying operations 1004, 1010, and 1012 with respect to a portion 1002 (which can represent a portion 920(i)) of the portions 920 indicated in the classification training data 916 of the training command-line text 908. These operations can be applied, e.g., for each of a plurality of portions 920. Some examples use multiple portions 920, e.g., in training batches or minibatches.

At 1004, the training module 228 can sequentially provide characters 1006(1)-1006(V) (individually or collectively referred to herein with reference 1006) of portion 1002 to the trained representation mapping 904 (for V characters of portion 1002). In response, trained representation mapping 904 can provide respective representation vectors 1008(1)-1008(V) (individually or collectively referred to herein with reference 1008). Examples are discussed herein, e.g., with reference to FIG. 3 and operations 410, 512, and 716.

At 1010, the training module 228 can select one representation vector 1008(i) of the respective representation vectors 1008. For example, the training module 228 can select the last (1008(V)), next-to-last (1008(V−1)), or middle (e.g., 1008([V/2])), or another of the respective representation vectors 1008. The choice of i can be stored in a memory, e.g., as code or data. As discussed above with reference to FIG. 3, characters 1 . . . i can affect representation vector 1008(i), e.g., in RNN-based CMs. Therefore, operation 1010 can include selecting i based on the number of characters of portion 1002 to be taken into account while training classifier 912.

At 1012, training module 228 can adjust the parameters of the second model structure 914 based on the selected one representation vector 1008(i) and on the training indicator 1014 (which can represent a training indicator 918) associated with portion 1002. Examples are discussed herein, e.g., with reference to FIG. 3. For example, training indicator 1014 can indicate that portion 1002 was drawn from a dirty event. Therefore, training module 228 can adjust the parameters of the second model structure 914 to increase the likelihood that classifier 912 will predict "dirty" when given representation vector 1008(i) as input.

In some examples, operations 1010 and 1012 are repeated for a particular portion 1002. For example, operations 1010 and 1012 can be performed for both i=[V/2] and i=V.

Figure 11:
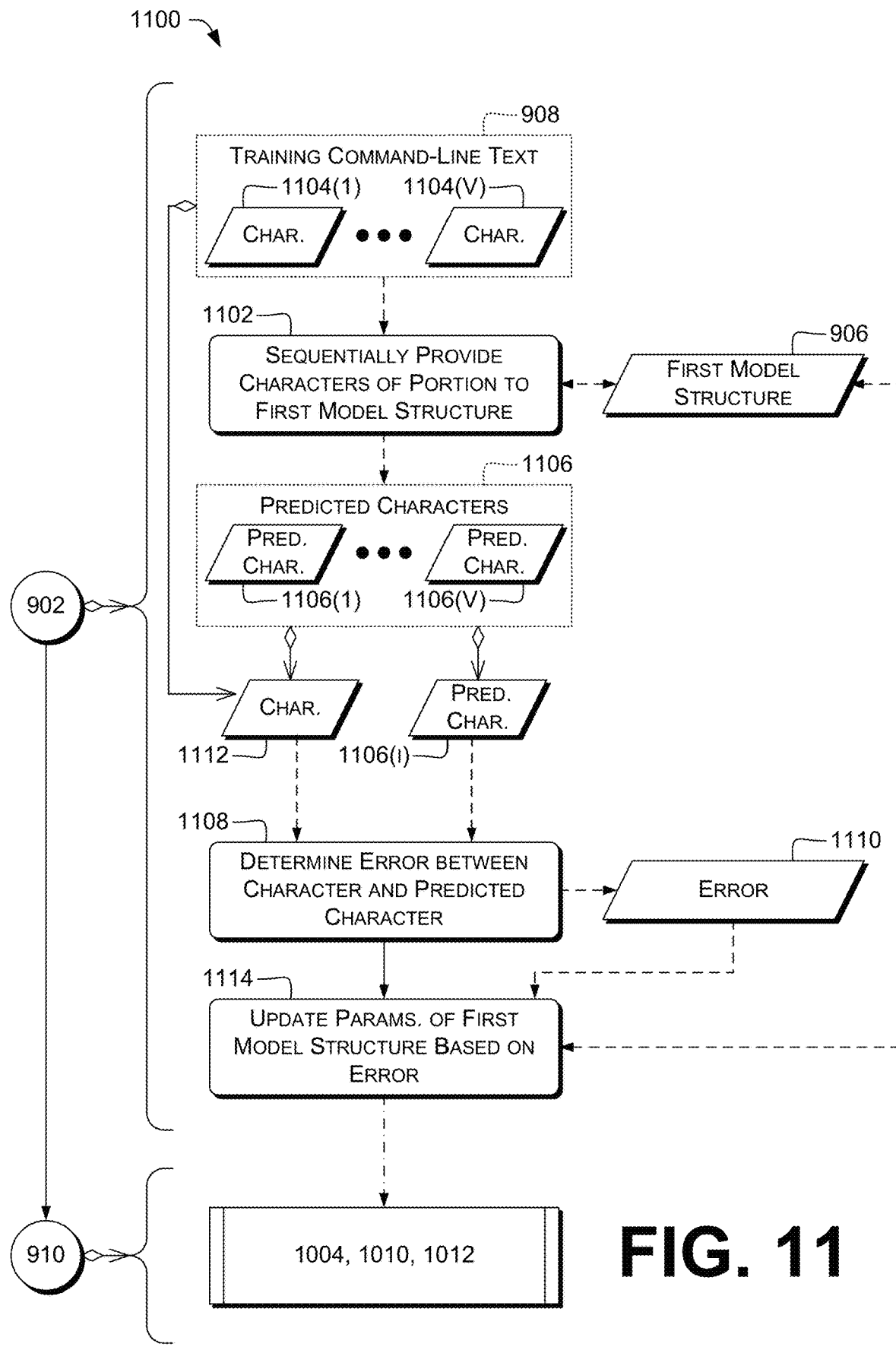
FIG. 11 is a dataflow diagram that illustrates example techniques for training a classifier.

FIG. 11 is a dataflow diagram that illustrates example techniques 1100 for determining CMs, e.g., for analyzing events, and related dataflow (shown dashed for clarity). In some examples, techniques 1100 can be performed by a control unit, as described herein, e.g., of a computing device 102. In some examples, operation 902 of determining the trained representation mapping 904 includes operations 1102, 1108, and 1114.

At 1102, training module 228 can sequentially provide characters 1104(1)-1104(T) (individually or collectively referred to herein with reference 1104) of the training command-line text 908 to the first model structure 906 to cause the first model structure 906 to output respective predicted characters 1106(1)-1106(T) (individually or collectively referred to herein with reference 1106). Examples are discussed herein, e.g., with reference to FIG. 3 and operations 410, 512, 716, and 1004.

At 1108, training module 228 can determine an error 1110 between one of the characters 1112 of the training command-line text 908 and the respective predicted character 1106(i). For example, character 1112 can be character 1104(i+1) (or 1104(i+k), k≥1).

At 1114, training module 228 can update the parameters of the first model structure 906 based at least in part on the error 1110. Examples are discussed herein, e.g., with reference to FIG. 3. Backpropagation for RNNs (e.g., PYTORCH torch.autograd.backward ( )) can be used in some examples.

In some examples, operation 1108 can be used multiple times before operation 1114 is performed. For example, respective errors for multiple values of i can be aggregated, e.g., averaged or summed, and the parameter update at operation 1114 can be performed based on the aggregated error. Examples are discussed herein, e.g., with reference to FIG. 3.

In some examples, operations 1102-1114 are used to train representation mapping 904. In some examples, operations 1004-1012 are used to train classifier 912. In some examples, indicated by the dash-dot arrow, operation 1114 is followed by operations 1004-1012. In some examples, accordingly, representation mapping 904 is trained, then classifier 912 is subsequently trained. Examples are discussed herein, e.g., with reference to FIG. 3.

Figure 12:
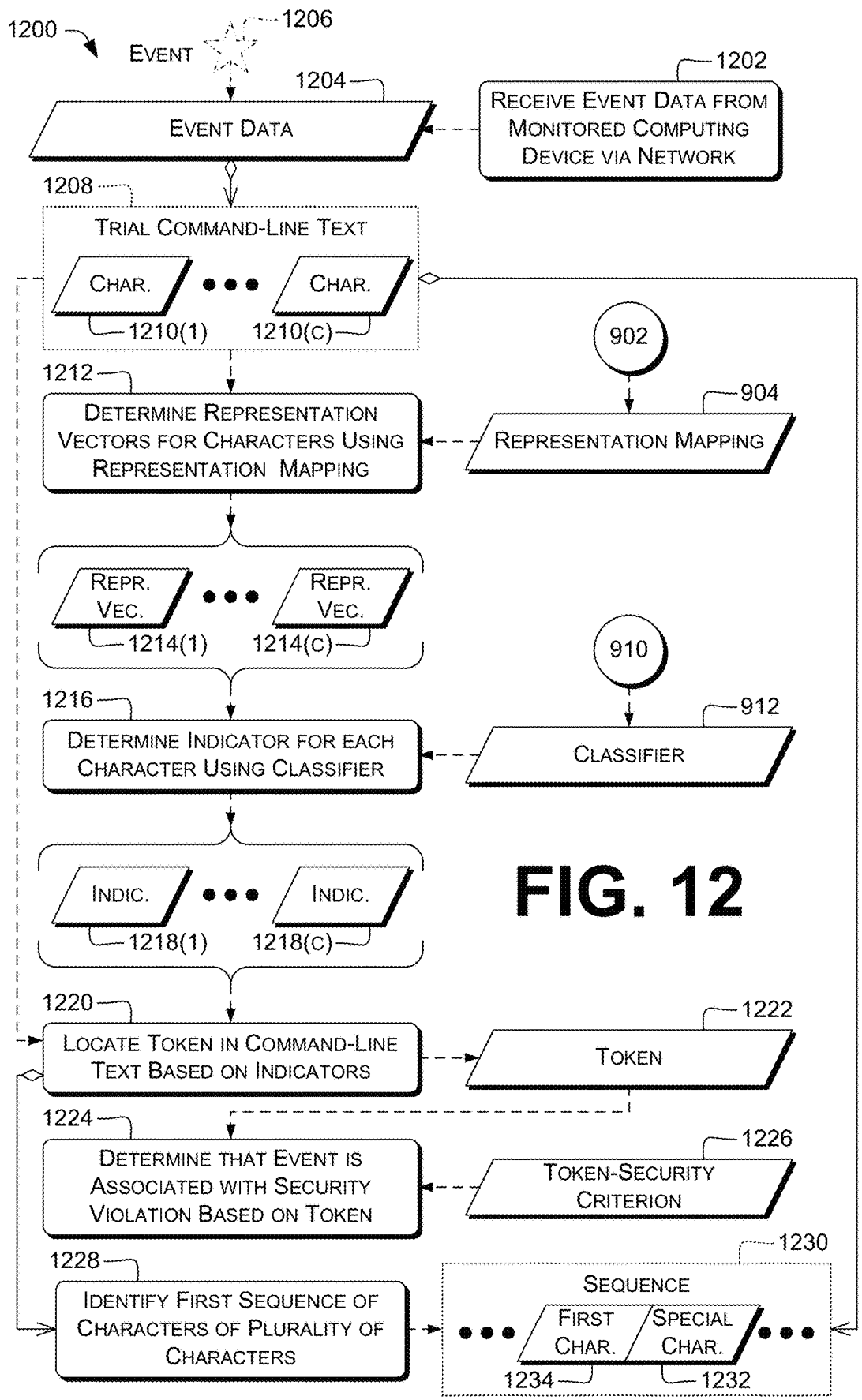
FIG. 12 is a dataflow diagram that illustrates example techniques for analyzing event data and conducting communications between a monitored computing device and a security-service server.

FIG. 12 is a dataflow diagram that illustrates example techniques 1200 for analyzing events and interfacing between monitored computing devices 104 and cluster 106 (or another security service), and related dataflow (shown dashed for clarity). In some examples, techniques 1200 can be performed by a control unit, e.g., as discussed herein with reference to FIG. 2. In some examples, operation 902 can precede operation 1212, or operation 910 can precede operation 1216.

At 1202, the communications module 234 can receive event data 1204 associated with an event 1206 at a monitored computing device 104. Event data 1204 can include trial command-line text 1208 that includes a plurality of trial characters 1210. Examples are discussed herein, e.g., with reference to operation 618.

At 1212, the representation subsystem 246 can sequentially provide at least some of the trial characters 1210 to the trained representation mapping 904 to determine respective trial representation vectors 1214. Examples are discussed herein, e.g., with reference to operations 410, 512, 716, 802, 1004, and 1102.

At 1216, the representation subsystem 246 can determine, for each of the trial characters 1210, a respective trial indicator 1218 at least partly by applying the respective trial representation vector 1214 to the trained classifier 912. Examples are discussed herein, e.g., with reference to operations 416, 518, and 720.

At 1220, the representation subsystem 246 or the security subsystem 248 can locate at least one trial token 1222 in the trial command-line text 1208 based at least in part on the respective trial indicators 1218 of the trial characters 1210 in the trial command-line text 1208. Examples are discussed herein, e.g., with reference to operations 422, 524, 620, 810, and 812.

At 1224, the security subsystem 248 can determine that the event 1206 is associated with a security violation based at least in part on the at least one trial token 1222 satisfying a stored token-security criterion 1226, e.g., n tokens of length m. Examples are discussed herein, e.g., with reference to operations 426, 528, and 818.

In some examples, the plurality of trial characters 1210 comprises at least one special (e.g. punctuation) trial character and at least one non-special (e.g., alphanumeric) trial character. In some of these examples, operation 1220 of locating the at least one trial token 1222 can include operation 1228.

At 1228, the representation subsystem 246 can identify a first sequence 1230 of adjacent trial characters 1210 of the plurality of trial characters 1210 beginning from a starting trial character of the plurality of trial characters until reaching a special trial character 1232 preceded by a first trial character 1234. Examples are discussed herein, e.g., with reference to FIGS. 3 and 4, Table 1, and operations 620 and 812. In some examples of operation 1228, the respective trial indicator of the special trial character 1232 indicates that the special trial character 1232 is not associated with a security violation; and the respective trial indicator 1218 of the first trial character 1234 indicates that the first trial character 1234 is not associated with a security violation.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method of determining that an event is associated with a security violation, wherein: the event is associated with a monitored computing device; the event is associated with event data comprising command-line text; the command-line text comprises a plurality of characters; and the method comprises: sequentially providing characters of the plurality of characters to a trained representation mapping to determine respective representation vectors; determining, for each of the characters, a respective indicator at least partly by applying the respective representation vector to a trained classifier; locating at least one token in the command-line text based at least in part on the respective indicators of the characters in the command-line text; and determining that the event is associated with a security violation based at least in part on the at least one token satisfying a stored token-security criterion.

B: The method according to paragraph A, wherein: the plurality of characters comprises at least one special character and at least one non-special character; the locating the at least one token comprises identifying a first sequence of adjacent characters of the plurality of characters beginning from a starting character of the plurality of characters until reaching a special character preceded by a first character, wherein: the respective indicator of the special character indicates that the special character is not associated with a security violation; and the respective indicator of the first character indicates that the first character is not associated with a security violation.

C: The method according to paragraph A or B, further comprising: receiving the event data from the monitored computing device via a network; and in response to the determining that the event is associated with a security violation, transmitting a security command to the monitored computing device to cause the monitored computing device to perform a mitigation action.

D: The method according to any of paragraphs A-C, wherein the command-line text comprises: at least some text of a command line of a first process, the first process being a process that triggered the event; at least some text of a command line of a second process that is a parent process of the first process; and at least some text of a command line of a third process that is a parent process of the second process.

E: The method according to any of paragraphs A-D, further comprising: determining the trained representation mapping at least partly by adjusting parameters of a first model structure so that the trained representation mapping predicts, based on a character of training command-line text, an immediately following character in the training command-line text, within a predetermined accuracy; and determining the classifier at least partly by adjusting parameters of a second model structure using a supervised learning technique based on classification training data comprising training indicators associated with respective portions of the training command-line text.

F: The method according to any of paragraphs A-E, wherein: the trained representation mapping comprises at least two recurrent neural network (RNN) layers; and the trained classifier comprises at least one logistic-classification unit.

G: The method according to any of paragraphs A-F, with "characters" replaced by "event-data values".

H: A system comprising: at least one computer-readable memory storing a trained representation mapping, a trained classifier, and an indicator-security criterion; a communications interface configured to receive an event record, wherein the event record: is associated with an event of a plurality of events; is associated with a monitored computing device of a plurality of monitored computing devices; and comprises an ordered sequence of event-data values; and a control unit configured to perform operations comprising: sequentially providing event-data values of the ordered sequence of event-data values to the trained representation mapping to determine respective representation vectors, wherein a first representation vector of the representation vectors is associated with a first event-data value of the ordered sequence of event-data values; determining a first indicator at least partly by applying the first representation vector to the trained classifier; and determining that the first event-data value is associated with a security violation based at least in part on the first indicator satisfying the indicator-security criterion.

I: The system according to paragraph H, wherein: the at least one computer-readable memory stores a tokenization criterion; and the operations further comprise: determining a second indicator at least partly by applying a second representation vector of the representation vectors to the trained classifier, wherein the second indicator is associated with a second event-data value that immediately follows the first event-data value in the ordered sequence of event-data values; and determining a token in the ordered sequence of event-data values based at least in part on the first indicator and the second indicator satisfying the tokenization criterion.

J: The system according to paragraph I, wherein: the at least one computer-readable memory stores a token-security criterion; and the operations further comprise determining that the event is associated with a security violation based at least in part on the token satisfying the token-security criterion.

K: The system according to any of paragraphs H-J, the operations further comprising, after providing a predetermined number of the event-data values to the trained representation mapping, resetting a state value of the trained representation mapping.

L: The system according to any of paragraphs H-K, wherein the at least one computer-readable memory stores: the trained representation mapping comprising two recurrent neural network (RNN) layers; and the trained classifier comprising a logistic-classification unit.

M: The system according to any of paragraphs H-L, further comprising: at least partly in response to the determining that the first event-data value is associated with a security violation, transmitting a security command to the monitored computing device to cause the monitored computing device to perform a mitigation action.

N: The system according to any of paragraphs H-M, wherein the ordered sequence of event-data values comprises: at least one character of a command line of a first process, the first process being a process that triggered the event; at least one character of a command line of a second process that is a parent process of the first process; and at least one character of a command line of a third process that is a parent process of the second process.

O: At least one tangible, non-transitory computer-readable medium having stored thereon instructions executable by at least one processor to cause the at least one processor to perform operations comprising: determining a trained representation mapping at least partly by adjusting parameters of a first model structure so that the trained representation mapping predicts, based on a character of training command-line text, the immediately following character in the training command-line text, within a predetermined accuracy; and determining a classifier based at least in part on the trained representation mapping and at least partly by adjusting parameters of a second model structure using a supervised learning technique based on classification training data comprising training indicators indicating whether respective portions of the training command-line text are associated with security violations.

P: The at least one tangible, non-transitory computer-readable medium according to paragraph O, wherein: the first model structure comprises: an encoder that receives a character of training command-line text; a first recurrent neural network (RNN) layer fed by the encoder; a second RNN layer fed by the first RNN layer; and a decoder that outputs a predicted character; and the trained representation mapping comprises the encoder, the first RNN layer, and the second RNN layer.

Q: The at least one tangible, non-transitory computer-readable medium according to according to paragraph P, wherein the trained representation mapping excludes the decoder.

R: The at least one tangible, non-transitory computer-readable medium according to any of paragraphs O-Q, wherein: the trained representation mapping is configured to receive a sequence of characters and output respective representation vectors; and the operations for determining the classifier comprise, for at least one portion of a plurality of the portions of the training command-line text: sequentially providing characters of that portion to the trained representation mapping; selecting one representation vector of the respective representation vectors provided in response to the sequentially providing the characters by the trained representation mapping; and adjusting the parameters of the second model structure based on the selected one representation vector and on the training indicator associated with that portion.

S: The at least one tangible, non-transitory computer-readable medium according to any of paragraphs O-R, the operations for determining the trained representation mapping comprising: sequentially providing characters of the training command-line text to the first model structure to cause the first model structure to output respective predicted characters; determining an error between one of the characters of the training command-line text and the corresponding predicted character; and updating the parameters of the first model structure based at least in part on the error.

T: The at least one tangible, non-transitory computer-readable medium according to paragraph S, wherein: the trained representation mapping is configured to receive a sequence of characters and output respective representation vectors; and the operations for determining the classifier comprise, for at least one portion of a plurality of the portions of the training command-line text: sequentially providing characters of that portion to the trained representation mapping; selecting one representation vector of the respective representation vectors provided in response to the sequentially providing the characters by the trained representation mapping; and adjusting the parameters of the second model structure based on the selected one representation vector and on the training indicator associated with that portion.

U: The at least one tangible, non-transitory computer-readable medium according to any of paragraphs O-T, the operations further comprising: receiving event data associated with an event at a monitored computing device, the event data comprising trial command-line text and the trial command-line text comprising a plurality of trial characters; and sequentially providing trial characters of the plurality of trial characters to the trained representation mapping to determine respective trial representation vectors; determining, for each of the trial characters, a respective trial indicator at least partly by applying the respective trial representation vector to the trained classifier; locating at least one token in the trial command-line text based at least in part on the respective trial indicators of the trial characters in the trial command-line text; and determining that the event is associated with a security violation based at least in part on the at least one trial token satisfying a stored token-security criterion.

V: The at least one tangible, non-transitory computer-readable medium according to paragraph U, wherein: the plurality of trial characters comprises at least one special trial character and at least one non-special trial character; the operations for locating the at least one trial token comprise identifying a first sequence of adjacent trial characters of the plurality of trial characters beginning from a starting trial character of the plurality of trial characters until reaching a special trial character preceded by a first trial character, wherein: the respective trial indicator of the special trial character indicates that the special trial character is not associated with a security violation; and the respective trial indicator of the first trial character indicates that the first trial character is not associated with a security violation.

W: The at least one tangible, non-transitory computer-readable medium according to any of paragraphs O-V, wherein the trained classifier comprises at least one logistic-classification unit.

X: The at least one tangible, non-transitory computer-readable medium according to any of paragraphs O-W, with "characters" replaced by "event-data values".

Y: A computer-readable medium, e.g., a computer storage medium, having thereon computer-executable instructions, the computer-executable instructions upon execution configuring a computer to perform operations as recited in paragraphs A-G, H-N, or O-X.

Z: A device comprising: a processor; and a computer-readable medium, e.g., a computer storage medium, having thereon computer-executable instructions, the computer-executable instructions upon execution by the processor configuring the device to perform operations as recited in paragraphs A-G, H-N, or O-X.

AA: A system comprising: means for processing; and means for storing having thereon computer-executable instructions, the computer-executable instructions including means to configure the system to carry out a method as recited in paragraphs A-G, H-N, or O-X.

AB: A method comprising performing operations as recited in paragraphs A-G, H-N, or O-X.

AC: At least one feature from each of at least two of the following groups: paragraphs A-G, paragraphs H-N, and paragraphs O-X.

CONCLUSION

Various techniques described herein, e.g., for performing security analyses of events 128, can permit more efficiently determining a classification of an event. Various examples provide automated detection of security violations (e.g., targeted attacks or malware-related events). Accordingly, security resources can be directed to events 402 more likely to be associated with security violations. This can reduce waste of security resources and can permit more quickly responding to violations.

Some examples may provide any of, or none of, the benefits listed herein, or other benefits. The claims are not limited to examples providing the benefits described above, and at least one embodiment may provide benefits that are not any of the benefits described above. Furthermore, the claimed subject matter is not limited to implementations that solve any or all disadvantages noted in any part of this disclosure.

Example embodiments described or shown herein are provided for purposes of example only. Statements made with respect to a particular example embodiment, or a specific aspect of that example embodiment, should not be construed as limiting other example embodiments described herein. Features described with regard to one type of example embodiment may be applicable to other types of example embodiments as well. The features discussed herein are not limited to the specific usage scenarios with respect to which they are discussed.

The word "or" and the phrase "or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," or any of those phrases with "or" substituted for "or," unless specifically stated otherwise, is to be understood as signifying that an item, term, etc. can be either X, or Y, or Z, or a combination of any elements thereof (e.g., a combination of XY, XZ, YZ, or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" is synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed examples. For example, computing devices 102 or 104, network 108, processing unit(s) 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer OS 216. In other instances, the functionality or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing device(s) 102, 104, or 200, such as one or more internal or external CPUs or GPUs, or one or more pieces of hardware logic such as FPGAs, DSPs, or other types of accelerators.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A method of determining that an event is associated with a security violation, wherein:
    the event is associated with a monitored computing device;
    the event is associated with event data comprising command-line text;
    the command-line text comprises a plurality of characters; and
    the method comprises:
        sequentially providing characters of the plurality of characters to a trained representation mapping to determine respective representation vectors, wherein the trained representation mapping is trained to predict, based on an individual character, at least one predicted character following the individual character;
        determining, for each of the characters, a respective indicator at least partly by applying the respective representation vector to a trained classifier;

locating at least one token in the command-line text based at least in part on the respective indicators of the characters in the command-line text comprising:
generating the at least one token beginning with a starting character,
concatenating a succeeding character to a preceding character when the succeeding character is not a special character, or the succeeding character is the special character and at least one of the special character and the preceding character is associated with the security violation,
identifying, from the plurality of characters, a first sequence of adjacent characters beginning with the starting character until reaching the special character preceded by a first character, wherein the respective indicator of the special character indicates that the special character is not associated with the security violation, and the respective indicator of the first character indicates that the first character is not associated with the security violation,
generating, based on the first sequence of adjacent characters, the at least one token; and
determining that the event is associated with the security violation based at least in part on the at least one token satisfying a token-security criterion.

2. The method according to claim 1, wherein:
the plurality of characters comprises at least one special character and at least one non-special character.

3. The method according to claim 1, further comprising:
receiving the event data from the monitored computing device via a network; and
in response to the determining that the event is associated with a security violation, transmitting a security command to the monitored computing device to cause the monitored computing device to perform a mitigation action.

4. The method according to claim 1, wherein the command-line text comprises:
at least some text of a command line of a first process, the first process being a process that triggered the event;
at least some text of a command line of a second process that is a parent process of the first process; and
at least some text of a command line of a third process that is a parent process of the second process.

5. The method according to claim 1, further comprising:
determining the trained representation mapping at least partly by adjusting parameters of a first model structure so that the trained representation mapping predicts, based on a character of training command-line text, an immediately following character in the training command-line text, within a predetermined accuracy; and
determining the classifier at least partly by adjusting parameters of a second model structure using a supervised learning technique based on classification training data comprising training indicators associated with respective portions of the training command-line text.

6. The method according to claim 1, wherein:
the trained representation mapping comprises at least two recurrent neural network (RNN) layers; and
the trained classifier comprises at least one logistic-classification unit.

7. The method according to claim 1, wherein the respective indicators of the characters include values being indicative of strength of association of the characters with the security violation, and the method further comprising:
determining an average value of the indicators associated with the characters in the at least one token, and
determining that the event is associated with the security violation based at least in part on the average value being equal to or greater than a token-security threshold.

8. A system comprising:
at least one computer-readable memory storing a trained representation mapping, a trained classifier, and an indicator-security criterion;
a communications interface configured to receive an event record, wherein the event record:
is associated with an event of a plurality of events;
is associated with a monitored computing device of a plurality of monitored computing devices; and
comprises an ordered sequence of event-data values; and
a control unit comprising at least a processor and configured to perform operations comprising:
sequentially providing event-data values of the ordered sequence of event-data values to the trained representation mapping to determine respective representation vectors, wherein the trained representation mapping is trained to predict, based on an individual event-data value, at least one predicted event-data value following the individual event-data value, and a first representation vector of the representation vectors is associated with a first event-data value of the ordered sequence of event-data values;
determining a first indicator at least partly by applying the first representation vector to the trained classifier;
determining a second indicator at least partly by applying a second representation vector of the representation vectors to the trained classifier, wherein the second indicator is associated with a second event-data value that immediately follows the first event-data value in the ordered sequence of event-data values;
determining a token in the ordered sequence of event-data values based at least in part on the first indicator and the second indicator satisfying the indicator-security criterion comprising:
generating the token beginning with a starting event-data value,
concatenating a succeeding event-data value to a preceding event-data value when the succeeding event-data value is not a special character, or the succeeding event-data value is the special character and at least one of the succeeding event-data value and the preceding event-data value is associated with a security violation,
identifying a sequence of adjacent event-data values beginning with the starting event-data value and ending at the second event-data value being the special character, wherein the second indicator indicates that the second event-data value is not associated with the security violation, and the first indicator indicates that the first event-data value is not associated with the security violation, and
setting the sequence of adjacent event-data values as the token; and
determining that the event is associated with the security violation based at least in part on the token satisfying a tokenization security criterion.

9. The system according to claim 8, the operations further comprising, after providing a predetermined number of the event-data values to the trained representation mapping, resetting a state value of the trained representation mapping.

10. The system according to claim 8, wherein the at least one computer-readable memory stores:
the trained representation mapping comprising two recurrent neural network (RNN) layers; and
the trained classifier comprising a logistic-classification unit.

11. The system according to claim 8, further comprising:
at least partly in response to the determining that the first event-data value is associated with the security violation, transmitting a security command to the monitored computing device to cause the monitored computing device to perform a mitigation action.

12. The system according to claim 8, wherein the ordered sequence of event-data values comprises:
at least one character of a command line of a first process, the first process being a process that triggered the event;
at least one character of a command line of a second process that is a parent process of the first process; and
at least one character of a command line of a third process that is a parent process of the second process.

13. The system according to claim 8, wherein determining that the event is associated with the security violation based at least in part on the token satisfying the tokenization security criterion further comprises:
determining an average value of the indicators associated with the event-data values in the token, and
determining that the event is associated with the security violation based at least in part on the average value being equal to or greater than a token-security threshold.

14. At least one tangible, non-transitory computer-readable medium having stored thereon instructions executable by at least one processor to cause the at least one processor to perform operations comprising:
determining a trained representation mapping at least partly by adjusting parameters of a first model structure so that the trained representation mapping predicts, based on a character of training command-line text, an immediately following character in the training command-line text, within a predetermined accuracy;
adjusting parameters of a second model structure using a supervised learning technique based on classification training data comprising training indicators indicating whether respective portions of the training command-line text are associated with a security violation;
generating a classifier from the second model structure based at least in part on the trained representation mapping,
receiving event data associated with an event at a monitored computing device, the event data comprising trial command-line text and the trial command-line text comprising a plurality of trial characters;
sequentially providing the plurality of trial characters to the trained representation mapping to determine respective trial representation vectors;
determining, for each of the trial characters, a respective trial indicator at least partly by applying the respective trial representation vector to the classifier;
locating at least one trial token in the trial command-line text based at least in part on the respective trial indicators of the trial characters in the trial command-line text satisfying an indicator-security criterion, the respective trial indicators include values being indicative of strength of association of the trial characters with the security violation; and
determining that the event is associated with the security violation based at least in part on the at least one trial token satisfying a token-security criterion including:
determining an average value of the trial indicators in the at least one trial token, and
determining that the event is associated with the security violation based at least in part on the average value being equal to or greater than a token-security threshold,
wherein the trained representation mapping is configured to receive a sequence of characters and for an individual character, output a respective representation vector including a predicted character following the individual character.

15. The at least one tangible, non-transitory computer-readable medium according to claim 14, wherein:
the first model structure comprises:
an encoder that receives a character of training command-line text;
a first recurrent neural network (RNN) layer fed by the encoder;
a second RNN layer fed by the first RNN layer; and
a decoder that outputs a predicted character; and
the trained representation mapping comprises the encoder, the first RNN layer, and the second RNN layer.

16. The at least one tangible, non-transitory computer-readable medium according to claim 14, wherein:
the operations for generating the classifier comprise, for at least one portion of a plurality of the portions of the training command-line text:
sequentially providing characters of that portion to the trained representation mapping;
selecting one representation vector of respective representation vectors provided in response to the sequentially providing the characters by the trained representation mapping; and
adjusting the parameters of the second model structure based on the selected one representation vector and on a training indicator associated with that portion.

17. The at least one tangible, non-transitory computer-readable medium according to claim 14, the operations for determining the trained representation mapping comprising:
sequentially providing characters of the training command-line text to the first model structure to cause the first model structure to output respective predicted characters;
determining an error between one of the characters of the training command-line text and the corresponding predicted character; and
updating the parameters of the first model structure based at least in part on the error.

18. The at least one tangible, non-transitory computer-readable medium according to claim 17, wherein:
the trained representation mapping is configured to receive a sequence of characters and output respective representation vectors; and
the operations for generating the classifier comprise, for at least one portion of a plurality of the portions of the training command-line text:
sequentially providing characters of that portion to the trained representation mapping;
selecting one representation vector of respective representation vectors provided in response to the sequentially providing the characters by the trained representation mapping; and adjusting the parameters of the second model structure based on the selected one representation vector and on a training indicator associated with that portion.

19. The at least one tangible, non-transitory computer-readable medium according to claim 14, wherein:

the plurality of trial characters comprises at least one special trial character and at least one non-special trial character;

the operations for locating the at least one trial token comprise identifying a first sequence of adjacent trial characters of the plurality of trial characters beginning from a starting trial character of the plurality of trial characters until reaching a special trial character preceded by a first trial character, wherein the respective trial indicator of the special trial character indicates that the special trial character is not associated with the security violation; and the respective trial indicator of the first trial character indicates that the first trial character is not associated with the security violation.

\* \* \* \* \*